(12) United States Patent
Hosoya

(10) Patent No.: US 7,714,958 B2
(45) Date of Patent: May 11, 2010

(54) DISPLAY DEVICE

(75) Inventor: Kunio Hosoya, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 259 days.

(21) Appl. No.: 11/598,322

(22) Filed: Nov. 13, 2006

(65) Prior Publication Data

US 2007/0109470 A1    May 17, 2007

(30) Foreign Application Priority Data

Nov. 15, 2005    (JP)    ............... 2005-329867

(51) Int. Cl.
G02F 1/1333    (2006.01)
(52) U.S. Cl. .................................. 349/110
(58) Field of Classification Search ................ 349/110
See application file for complete search history.

(56) References Cited

U.S. PATENT DOCUMENTS

| | | | |
|---|---|---|---|
| 6,618,100 B2 | 9/2003 | Oike et al. | |
| 6,853,421 B2 | 2/2005 | Sakamoto et al. | |
| 7,023,021 B2 | 4/2006 | Yamazaki et al. | |
| 7,333,167 B2 * | 2/2008 | Kawase ..................... | 349/106 |
| 7,532,277 B2 * | 5/2009 | Kwon et al. ................ | 349/110 |
| 2005/0094067 A1 | 5/2005 | Sakamoto et al. | |
| 2006/0081846 A1 | 4/2006 | Yamazaki et al. | |
| 2006/0279687 A1 * | 12/2006 | Park et al. ................... | 349/142 |
| 2007/0085112 A1 | 4/2007 | Yamazaki et al. | |
| 2008/0067595 A1 | 3/2008 | Kawase | |

FOREIGN PATENT DOCUMENTS

| | | |
|---|---|---|
| CN | 1234879 A | 11/1999 |
| CN | 1314715 A | 9/2001 |
| CN | 1402064 A | 3/2003 |
| CN | 1476594 A | 2/2004 |
| EP | 1 128 430 A2 | 8/2001 |
| EP | 1 284 433 A2 | 2/2003 |
| EP | 1 422 682 A1 | 5/2004 |
| JP | 2002-350800 | 12/2002 |
| KR | 2004071519 A * | 8/2004 |

OTHER PUBLICATIONS

Office Action re Chinese Patent Application No. CN 200610160432.4, dated Jun. 19, 2009 (with English translation).

* cited by examiner

*Primary Examiner*—Sarah Song
(74) *Attorney, Agent, or Firm*—Cook Alex Ltd.

(57) ABSTRACT

It is an object of the present invention to provide a liquid crystal display device and the like with high visibility by forming a marker for alignment without increasing an additional step, thereby enabling alignment with high accuracy and reduction in time required for an inspection process in addition to suppressing reduction in yield. A pattern formed over an active matrix substrate which is one of a pair of substrates arranged to be opposed to each other and has a pixel portion is formed as a first marker for alignment, and an opening portion of a light-shielding film formed over an opposite substrate which is the other one of the pair of substrates is formed as a second marker for the alignment. It is to be noted that, by conducting alignment using these markers, alignment of the active matrix substrate and the opposite substrate with high accuracy can be conducted.

33 Claims, 13 Drawing Sheets 501 503
502

501 505
504

501 507
506

501 509
508

501 511
510

501 513
512

501 515
514

501 517
516

501 519
518

501 521
520

DISPLAY DEVICE

BACKGROUND OF THE INVENTION

1. Field of the Invention

The present invention relates to an active matrix liquid crystal display device and the like.

2. Description of the Related Art

Conventionally, an active matrix liquid crystal display device using an active element such as a thin film transistor (TFT) has been known. In an active matrix liquid crystal display device, pixel density can be heightened. In addition, an active matrix liquid crystal display device is small and lightweight, and consumes low power. Accordingly, products such as a monitor for a personal computer, a liquid crystal television, and a monitor for a car navigation system have been developed as one of flat panel displays in substitution for a CRT.

In a liquid crystal display device, display is conducted in the following manner: a substrate (an active matrix substrate) provided with a pixel portion including a first electrode (a pixel electrode) and the like in addition to a plurality of TFTs and a wiring and a substrate (an opposite substrate) provided with a second electrode (an opposite electrode), a light-shielding film (a black matrix), a colored film (a color filter), and the like are attached to each other; a space between these substrates is filled with a liquid crystal and sealed; and liquid crystal molecules are oriented by an electric field which is applied between the pixel electrode and the opposite electrode to control the amount of light from a light source.

However, it is necessary to conduct alignment with favorable accuracy in attaching the active matrix substrate and the opposite substrate to each other. If the alignment is insufficient, misalignment is caused between the pixel electrode over the active matrix substrate, and the colored film or the light-shielding film over the opposite substrate. This results in reduction in contrast due to light leakage in addition to out of color registration and a blur in an image in displaying, and accordingly, a problem of display with poor visibility is caused.

Concerning this issue, a manufacturing method of a liquid crystal display device is reported as follows: a colored film and a light-shielding film which are conventionally formed over an opposite substrate are formed over an active matrix substrate, and in a step of manufacturing any of a switching element, a colored film, and a light-shielding film, a first marker (an alignment marker) formed using metal or a resin film over the active matrix substrate and a second marker (an alignment marker) formed by coating the opposite substrate with a conductive paint material are compared, whereby alignment with favorable accuracy is possible in attaching the substrates to each other (refer to Patent Document 1: Japanese Published Patent Application No. 2002-350800).

However, the formation of the markers (the first marker and the second marker) for alignment over the active matrix substrate and the opposite substrate, respectively, in an additional step is one of the factors for further reduction in yield in manufacturing a liquid crystal display device and the like through a complicated process. Moreover, a problem that alignment accuracy is lowered and an inspection process for alignment requires much time occurs as a panel is enlarged.

SUMMARY OF THE INVENTION

It is an object of the present invention to provide a liquid crystal display device and the like with high visibility by forming a marker for alignment without increasing an additional step, thereby enabling alignment with high accuracy and reduction in time required for an inspection process in addition to suppressing reduction in yield.

One feature of a liquid crystal display device and the like of the present invention is that a pattern formed over an active matrix substrate which is one of a pair of substrates arranged to be opposed to each other and has a pixel portion is formed as a first marker for alignment, and an opening portion of a light-shielding film formed over an opposite substrate which is the other one of the pair of substrates is formed as a second marker for the alignment. By conducting alignment using these markers, alignment of the active matrix substrate and the opposite substrate with high accuracy can be conducted. In addition, a pattern formed in the present invention can be formed using a semiconductor film, an insulating film, a conductive film, or the like formed in a manufacturing process of the active matrix substrate.

A liquid crystal display device in the present invention can be applied in any of a transmissive type, a semi-transmissive type, a low-reflective type (a structure in which the area of a reflective portion is smaller than the area of a transmissive portion), and a reflective type.

Further, the present invention can be applied to a liquid crystal display device using wide viewing angle technique such as an MVA (Multi-domain Vertical Alignment) liquid crystal, a PVA (Patterned Vertical Alignment) liquid crystal, or an ASV (Advanced Super View) liquid crystal, in which alignment of an active matrix substrate and an opposite substrate is important.

A specific structure relating to a liquid crystal display device and the like of the present invention includes at least a pattern formed over one of a pair of substrates arranged to be opposed to each other, and a light-shielding film which is formed over the other one of the pair of substrates and has an opening portion, where the pattern and the opening portion are opposed to each other in the same location.

Another structure relating to a liquid crystal display device and the like of the present invention includes at least a wiring, a thin film transistor, a pixel electrode, and a pattern over one of a pair of substrates arranged to be opposed to each other, and an opposite electrode and a light-shielding film having an opening portion over the other one of the pair of substrates, where the pattern is formed over the wiring, the wiring and the pixel electrode partially overlap, and the pattern and the opening portion are opposed to each other in the same location.

Another structure relating to a liquid crystal display device and the like of the present invention includes at least a wiring, a thin film transistor, a pixel electrode, and a pattern over one of a pair of substrates arranged to be opposed to each other, and an opposite electrode and a light-shielding film having an opening portion over the other one of the pair of substrates, where the pattern is formed over the wiring, part of the pixel electrode overlaps with the wiring in a location in which the pixel electrode does not overlap with the pattern, and the pattern and the opening portion are opposed to each other in the same location.

Another structure relating to a liquid crystal display device and the like of the present invention includes at least a wiring, a thin film transistor, a pixel electrode, and a pattern over one of a pair of substrates arranged to be opposed to each other, and an opposite electrode and a light-shielding film having an opening portion over the other one of the pair of substrates, where the pattern is formed over the wiring, a reflective conductive film is formed over part of the pixel electrode, and the pattern and the opening portion are opposed to each other in the same location.

In each of the above structures, the reflective conductive film is formed so that the area thereof is equal to or less than 50% of the area of the pixel electrode.

In each of the above structures, the pattern is formed using the same semiconductor film as a channel formation region included in the thin film transistor.

In each of the above structures, although the pattern can be formed using a semiconductor film, an insulating film, a conductive film, or the like, the pattern is preferably formed using an amorphous semiconductor or a crystalline semiconductor, containing silicon or silicon-germanium as its main component.

In each of the above structures, the pattern is a marker having any of a cross shape, a quadrangle, and a circle.

In each of the above structures, the opening portion has a similar shape with a similarity ratio of 1 or more with respect to the pattern.

In the present invention, a liquid crystal display device refers to a device using a liquid crystal element, namely an image display device. Further, the following are all included in a liquid crystal display device: a module in which a connector, for example, an FPC (flexible printed circuit), a TAB (tape automated bonding) tape, or a TCP (tape carrier package) is attached to a liquid crystal display panel; a module provided with a printed wiring board at the end of a TAB tape or a TCP; and a module in which an IC (integrated circuit) or a CPU (central processing unit) is directly mounted on a liquid crystal display panel by a COG (chip on glass) method.

In a liquid crystal display device and the like of the present invention, a marker (also referred to as a first marker) formed in a pixel portion over an active matrix substrate is formed in each pixel of the pixel portion without providing an additional step, and a marker (also referred to as a second marker) over an opposite substrate, which is formed to correspond to the first marker is also formed in patterning a light-shielding film at the same time. Accordingly, reduction in yield can be prevented because the number of steps is not increased in either case.

By conducting alignment using the marker, alignment in the entire surfaces of both substrates can be conducted with high accuracy. Therefore, an active matrix substrate and an opposite substrate can be attached to each other with high accuracy also in a case where a panel is enlarged. Further, since alignment of both substrates according to the present invention is conducted by making a first marker and a second marker overlap with each other, misalignment of both substrates is instantly grasped. Accordingly, reduction in time required for an inspection process can be attempted.

Furthermore, according to the present invention, alignment with high accuracy is possible; therefore, a liquid crystal display device and the like with high visibility can be provided.

DETAILED DESCRIPTION OF THE INVENTION

Hereinafter, one mode of the present invention will be explained in detail with reference to the accompanied drawings and the like. However, the present invention can be implemented in various embodiments, and unless such changes and modifications depart from the purpose and scope of the present invention, it is to be easily understood that various changes and modifications in modes and details thereof will be apparent to those skilled in the art. Therefore, it should be noted that the present invention should not be interpreted as being limited to the description of embodiment modes.

Embodiment Mode 1

In the present invention, a structure of an active matrix substrate and an opposite substrate which enables the active matrix substrate and the opposite substrate to be attached to each other with favorable accuracy will be explained with reference to FIG. 1, FIGS. 2A and 2B, FIGS. 3A and 3B, and FIGS. 4A and 4B. In this embodiment mode, a case where a pattern to be a first marker is formed using a semiconductor film will be explained.

Figure 1:
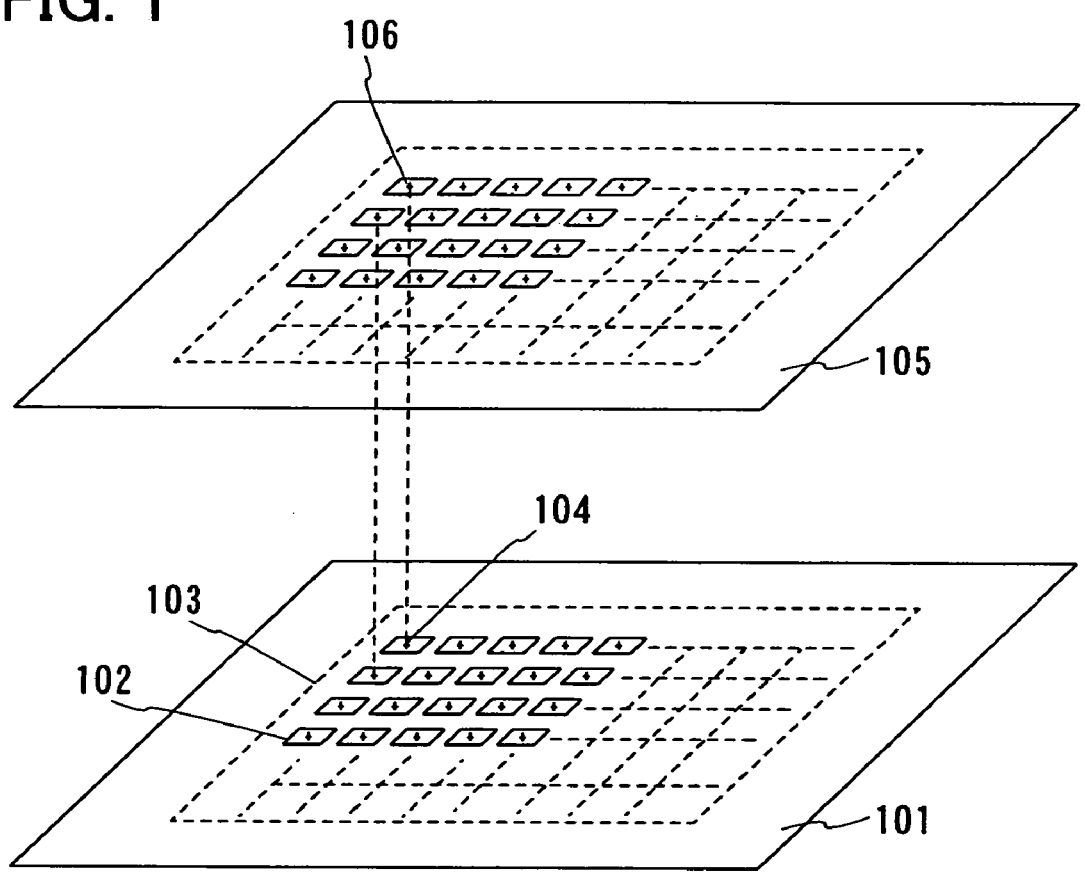
FIG. 1 is an explanatory view of a structure of the present invention.

In FIG. 1, a pixel portion 103 including a plurality of pixels 102 is formed over an active matrix substrate 101. Each pixel 102 is provided with a wiring, a pixel electrode, and the like as well as a switching element for driving. Further, a first marker 104 which is formed on the active matrix substrate 101 side for alignment in attachment is provided in each pixel 102.

On the other hand, an opposite electrode, a colored film, a light-shielding film, and the like are formed over the opposite substrate 105. It is to be noted that, in attaching the active matrix substrate 101 and the opposite substrate 105 to each other, a second marker 106 which is formed on the opposite substrate 105 side for the alignment in the attachment is formed by opening another opening portion in part of the light-shielding film provided to have an opening portion in a location almost overlapping with the pixel 102 over the active matrix substrate 101.

Therefore, the alignment in attaching the active matrix substrate 101 and the opposite substrate 105 in accordance with the present invention is conducted by making the first marker 104 and the second marker 106 overlap when these substrates overlap.

Figure 2A:
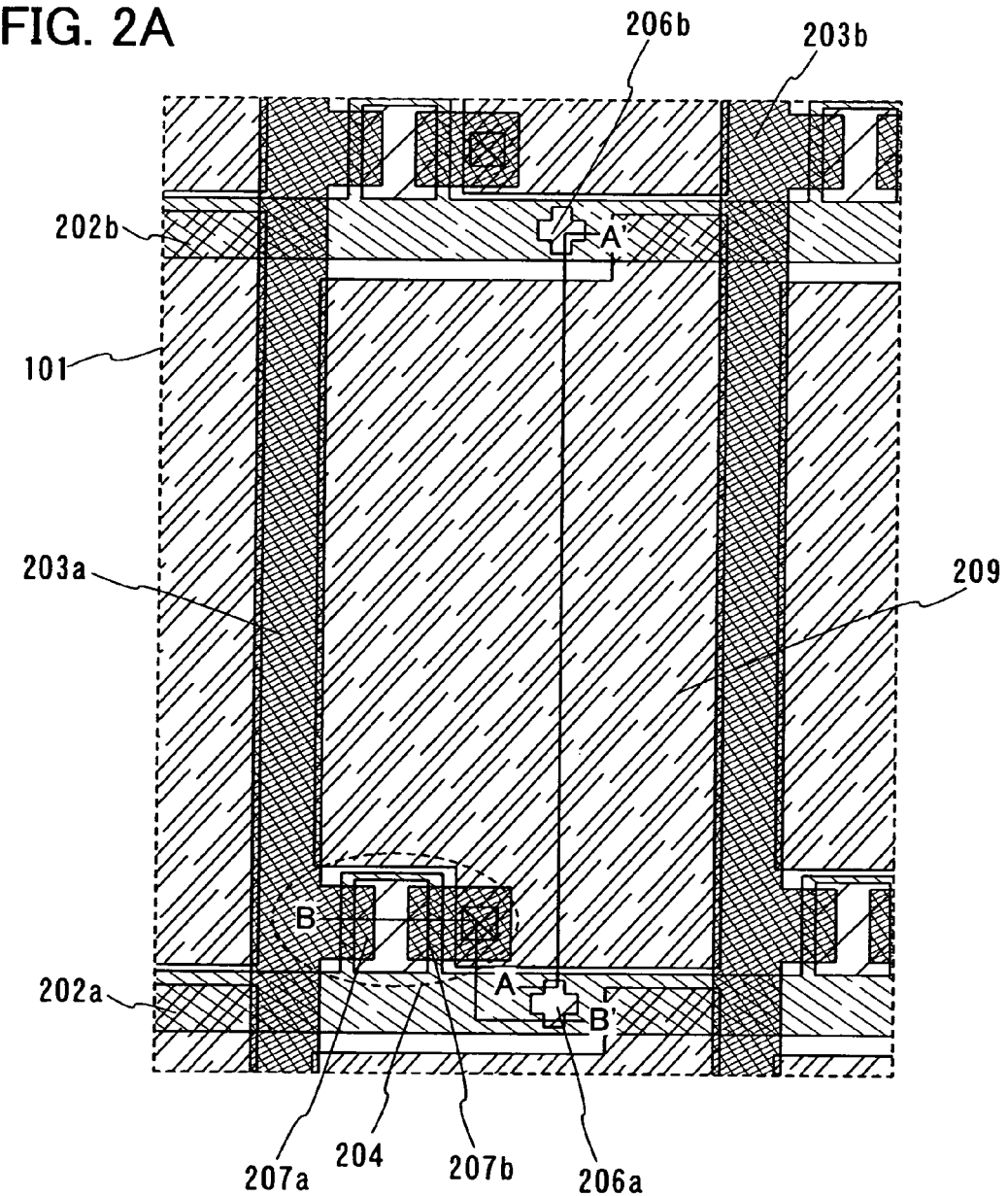
FIGS. 2A and 2B are explanatory views of a structure of an active matrix substrate of the present invention.

Next, a detailed structure of an active matrix substrate 101 will be explained with reference to FIGS. 2A and 2B. FIG. 2A shows a plane view of a pixel portion 103, and FIG. 2B shows a cross-sectional view taken along a line A-A' in FIG. 2A.

FIG. 2A is an enlarged view of part of the pixel portion 103, and each pixel is formed in a region surrounded by gate lines 202 (202a and 202b) and source lines 203 (203a and 203b). It is to be noted that a thin film transistor (TFT) 204 is formed in each pixel, and a case of forming an inverted staggered TFT is shown here. A pixel electrode 209 is formed to be electrically connected to the TFT 204. Further, a first marker 206 is formed over the gate line 202.

Figure 2B:
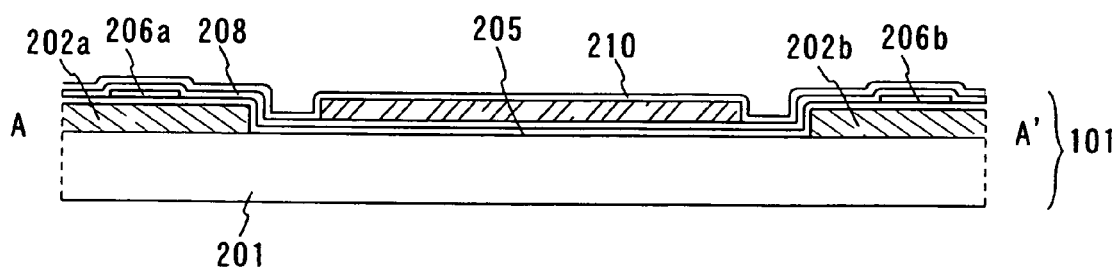

As shown in FIG. 2B, the gate lines 202 (202a and 202b) are formed over a substrate 201. The gate lines 202 (202a and 202b) can be formed using a film including a semiconductor such as Si or Ge, a film formed from a metal element such as Ag, Au, Cu, Ni, Pt, Pd, Ir, Rh, W, Al, Ta, Mo, Cr, Cd, Zn, Fe, Ti, Zr, Ba, or Nd, a film formed from an alloy material containing the element as its main component, a film in which Mo, Al, and Mo are stacked in this order from the substrate 101 side, a film in which Ti, Al, and Ti are stacked in this order from the substrate 101 side, a film in which MoN, Al—Nd, and MoN are stacked in this order from the substrate 101 side, a film in which Mo, Al—Nd, and Mo are stacked in this order from the substrate 101 side, a film in which Cr and Al are stacked in this order from the substrate 101 side, a film formed from a compound material such as metal nitride, or a film of indium tin oxide (ITO), indium zinc oxide (IZO) formed by using a target in which zinc oxide (ZnO) of 2 to 20 wt % is mixed with indium oxide containing silicon oxide, ITO containing silicon oxide as its composition, or the like, which is used as a transparent conductive film. In addition, a thickness of each of the gate lines 202 (202a and 202b) is preferably 150 nm or more, and more preferably 200 to 500 nm.

An insulating film 205 is formed over the gate lines 202 (202a and 202b), and part thereof is a gate insulating film of the TFT 204 though not shown here. It is to be noted that the insulating film 205 is formed using a single layer structure or a stacked structure of a silicon oxide film, a silicon nitride film, a silicon oxynitride film, a silicon nitride oxide film, other insulating films containing silicon, and the like. A thickness of the insulating film 205 is preferably 300 to 500 nm, and more preferably 350 to 480 nm.

A first semiconductor film is formed over the insulating film 205. The first semiconductor film can be formed using any of an amorphous semiconductor film, an amorphous semiconductor film partially containing a crystalline state, and a crystalline semiconductor film, each of which contains silicon, silicon-germanium (SiGe), or the like as its main component and has a different crystalline state. The semiconductor film can be formed by a known film formation method such as plasma CVD or sputtering. A thickness of the semiconductor film is preferably 40 to 250 nm, and more preferably 50 to 220 nm.

By patterning the first semiconductor film, a channel formation region of the TFT 204 and the first markers 206 (206a and 206b) are formed.

Although not shown here, a source region and a drain region formed using a second semiconductor film are formed over the channel formation region of the TFT 204. The second semiconductor film can be formed using any of an amorphous semiconductor film, an amorphous semiconductor film partially containing a crystalline state, and a crystalline semiconductor film, each of which contains silicon, silicon-germanium (SiGe), or the like as its main component and has a different crystalline state. The second semiconductor film to be used here includes an acceptor element or a donor element such as phosphorus, arsenic, and boron additionally to the aforementioned main component. A thickness of the second semiconductor film is preferably 30 to 250 nm, and more preferably 40 to 220 nm.

Further, in FIG. 2A, a source electrode 207a and a drain electrode 207b are formed over a source region and a drain region, respectively. It is to be noted that the source electrode 207a and the drain electrode 207b are formed using the same conductive film as the source lines 203 (203a and 203b).

The source electrode 207a, the drain electrode 207b, and the source lines 203 (203a and 203b) are preferably formed using a conductive material. Each thickness thereof is preferably 100 nm or more, and more preferably 200 to 500 nm. As a conductive material to be used here, a film containing a semiconductor such as Si or Ge, a film formed from a metal element such as Ag, Au, Cu, Ni, Pt, Pd, Ir, Rh, W, Al, Ta, Mo, Cr, Cd, Zn, Fe, Ti, Zr, or Ba, a film formed from an alloy material containing the element as its main component, a film formed from a compound material such as metal nitride, and the like are given.

Further, a protective film 208 is formed over the first markers 206 (206a and 206b), the source electrode 207a, the drain electrode 207b, and the source lines 203 (203a and 203b). The protective film 208 is formed using a single layer structure or a stacked structure of a silicon oxide film, a silicon nitride film, a silicon oxynitride film, a silicon nitride oxide film, and other insulating films containing silicon. A thickness of the protective film 208 is preferably 100 to 500 nm, and more preferably 200 to 400 nm.

The pixel electrode 209 is formed, which is electrically connected to the drain electrode 207b through an opening portion formed in part of the protective film 208 over the drain electrode 207b. It is to be noted that the pixel electrode 209 is preferably formed using a conductive material, and a thickness thereof is preferably 10 to 150 nm, and more preferably 40 to 125 nm.

As a conductive material to be used here, the following are given: indium tin oxide (ITO), zinc oxide (ZnO), indium zinc oxide (IZO) formed by using a target in which zinc oxide (ZnO) of 2 to 20 wt % is mixed with indium oxide containing silicon oxide, ITO containing silicon oxide as its composition, or the like, which is used as a transparent conductive film.

An orientation film 210 is formed using a known material such as polyimide over the pixel electrode 209. It is to be noted that the orientation film 210 is shown only in FIG. 2B out of FIGS. 2A and 2B as a matter of convenience for explanation.

In addition, a line B-B' in FIG. 2A will be explained in Embodiment Mode 2; therefore, the explanation is omitted here.

Figure 11A:
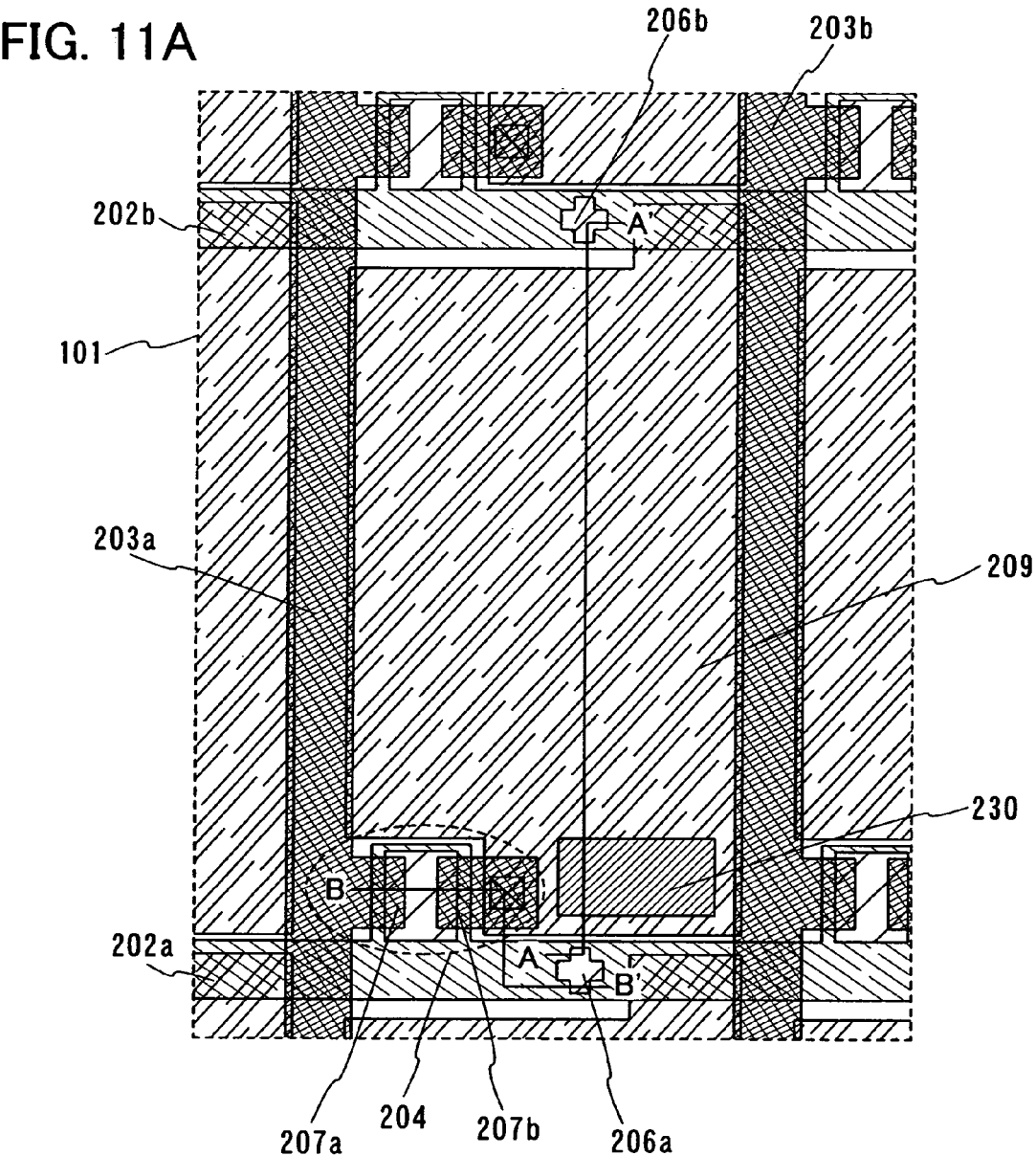
FIGS. 11A and 11B are explanatory views of a structure of an active matrix substrate of the present invention.
Figure 11B:
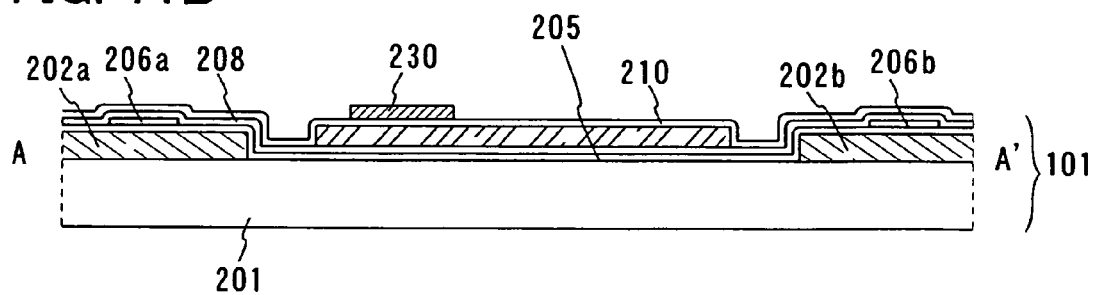

Since the present invention can be applied to a case of low-reflective type liquid crystal display, an active matrix substrate may be provided with a reflective electrode 230 in part of a pixel electrode 209 as shown in FIGS. 11A and 11B. An active matrix substrate shown in FIGS. 11A and 11B has the same structure as the active matrix substrate shown in FIGS. 2A and 2B except that the active matrix substrate shown in FIGS. 11A and 11B is provided with the reflective electrode 230. Therefore, the same reference numerals are used and the explanation will be omitted.

In this case, the reflective electrode 230 may be formed using a conductive film having a light-shielding property (for example, a film formed from a metal element such as Al or Ag, a film formed from an alloy material containing the element as its main component, or a film in which Al, IZO, and the like are stacked in this order from the substrate 101 side) to have a thickness of 10 to 150 nm, and more preferably 40 to 125 nm. It is to be noted that the indium zinc oxide (IZO) described above refers to a conductive film formed using a target in which zinc oxide (ZnO) of 2 to 20 wt % is mixed with indium oxide containing silicon oxide. The reflective electrode 230 may be formed so that the area thereof is equal to or less than 50% of the area of the pixel electrode 209.

Figure 12A:
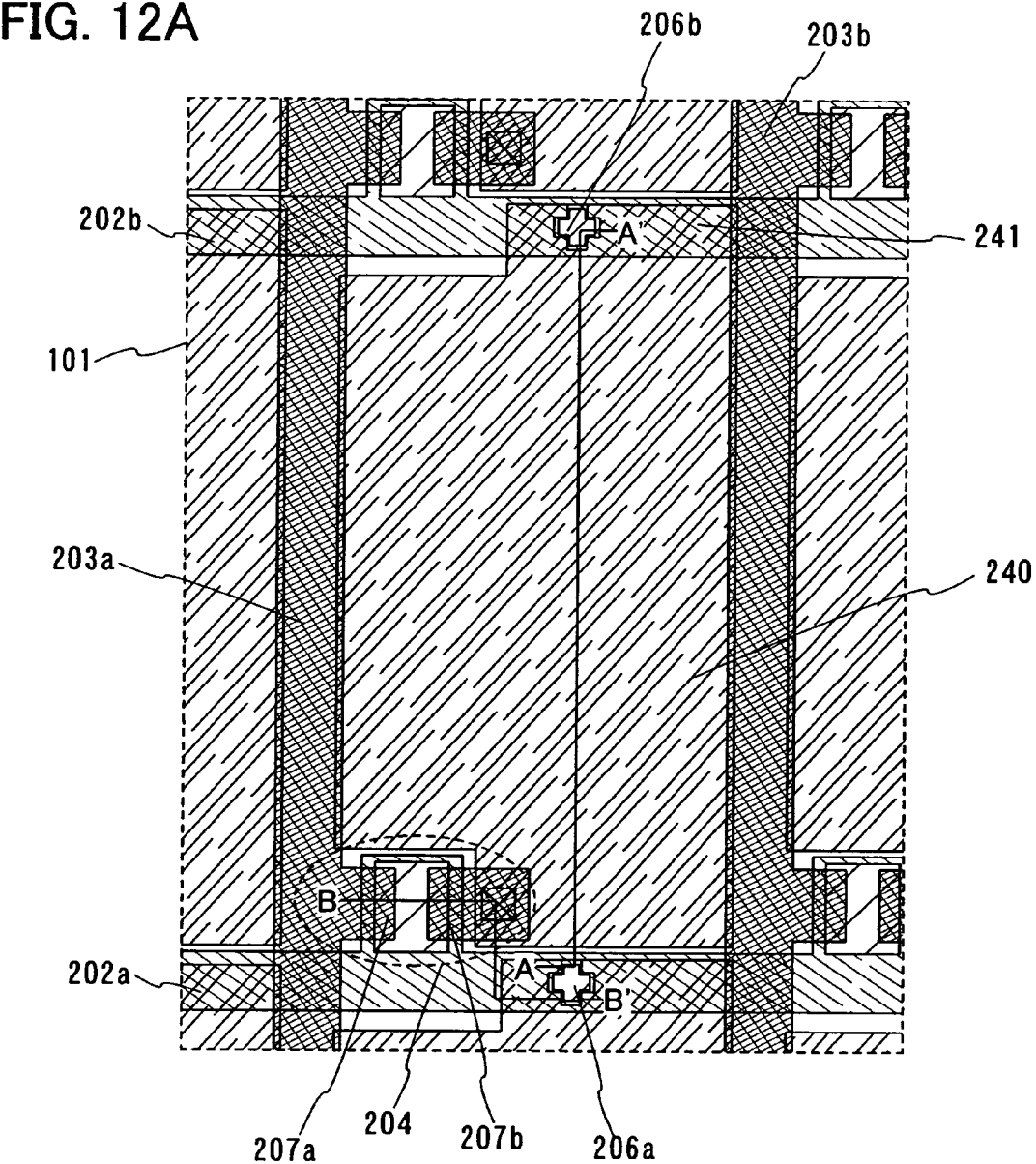
FIGS. 12A and 12B are explanatory views of a structure of an active matrix substrate of the present invention.
Figure 12B:
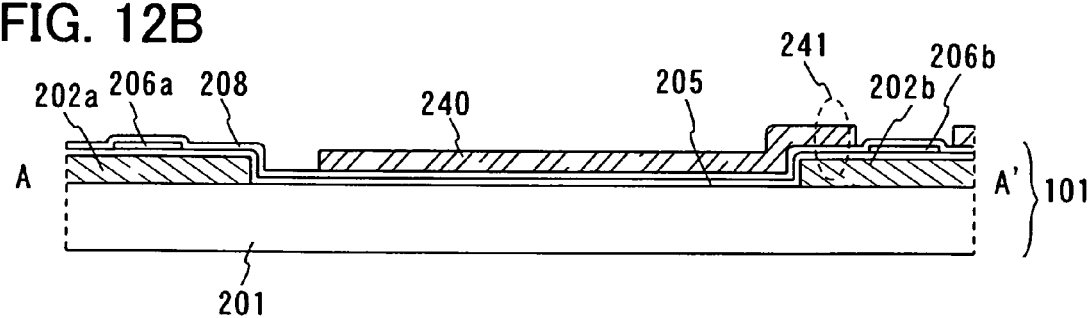

Further, by forming a pixel electrode 240 so that part of the pixel electrode overlaps with a gate line 202 (202a or 202b) as shown in FIGS. 12A and 12B, a capacitor can be formed between the gate line 202 (202a or 202b) and the pixel electrode 240 in a region a (241) shown in FIGS. 12A and 12B. In this case, the pixel electrode 240 is preferably formed so as not to overlap with first markers 206 (206a and 206b) formed over the gate lines 202 (202a and 202b). An active matrix substrate shown in FIGS. 12A and 12B has the same structure as the active matrix substrate shown in FIGS. 2A and 2B except that the active matrix substrate shown in FIGS. 12A and 12B is provided with the pixel electrode 240 so that part of the pixel electrode 240 is formed to overlap with the gate line 202 (202a or 202b). Therefore, the same reference numerals are used and the explanation will be omitted.

By employing the structure shown in FIGS. 12A and 12B, a capacitor can be formed without losing a light-transmitting property in a portion of the first marker 206.

In a case of the present invention, the first markers 206 (206a and 206b) formed over the active matrix substrate can be formed over a capacitor line for forming a capacitor between the pixel electrode and the capacitor line, in parallel with the gate lines 202 (202a and 202b) shown in FIGS. 2A and 2B.

Figure 3A:
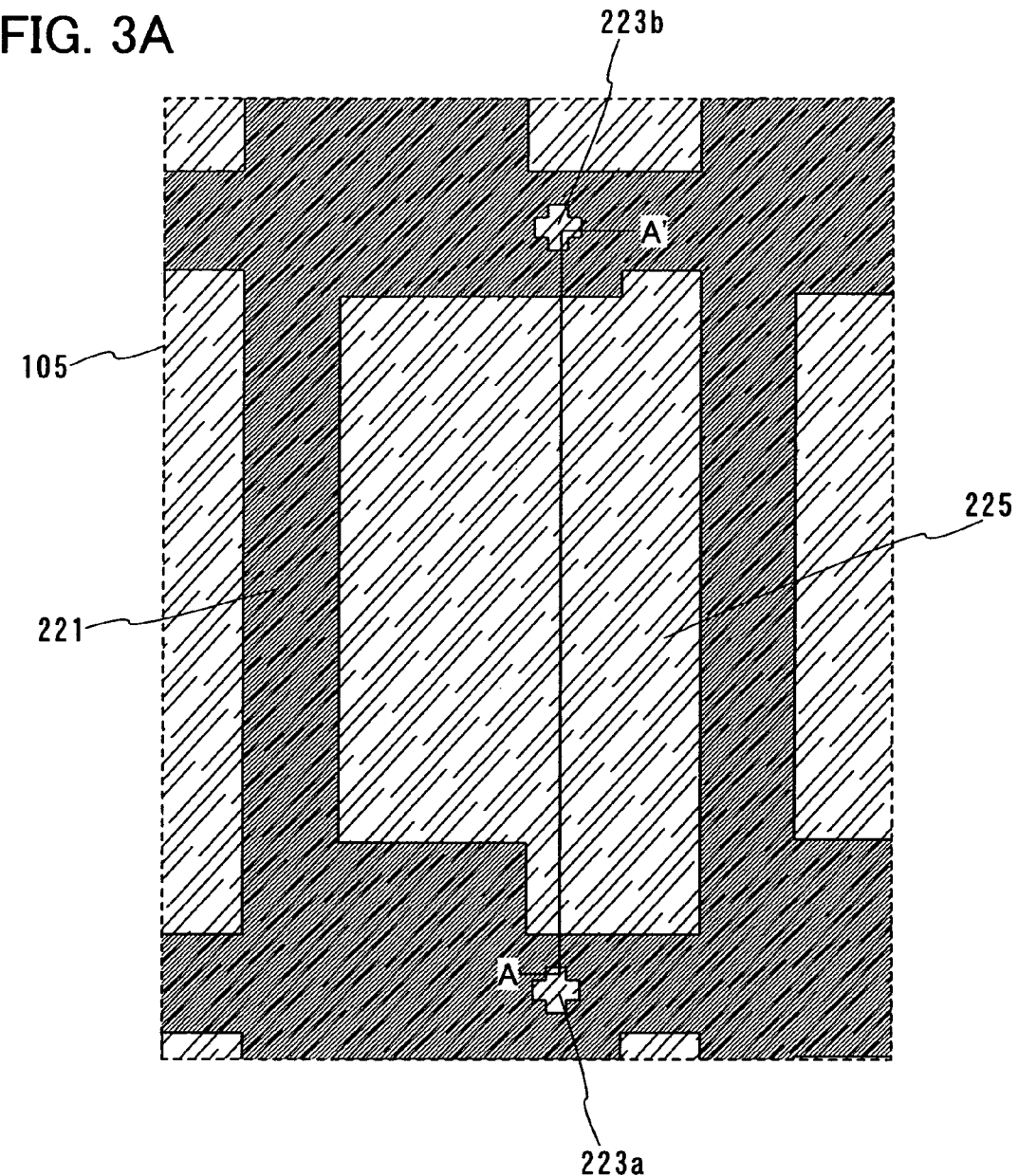
FIGS. 3A and 3B are explanatory views of a structure of an opposite substrate of the present invention.

Next, a detailed structure of the opposite substrate 105 (FIG. 1) will be explained with reference to FIGS. 3A and 3B. FIG. 3A shows a plane view of a portion to be attached to part of the pixel portion 103 of the active matrix substrate shown in FIGS. 2A and 2B, and FIG. 3B shows a cross-sectional view taken along a line A-A' in FIG. 3A.

FIG. 3A is an enlarged view of a portion which is over the opposite substrate and is to be attached to the pixel portion 103 of the active matrix substrate. An opposite electrode 225 is formed over a light-shielding film 221 which is formed except a region overlapping with a pixel of the active matrix substrate and a portion overlapping with the first markers 206 (206a and 206b) (FIGS. 2A and 2B).

Figure 3B:
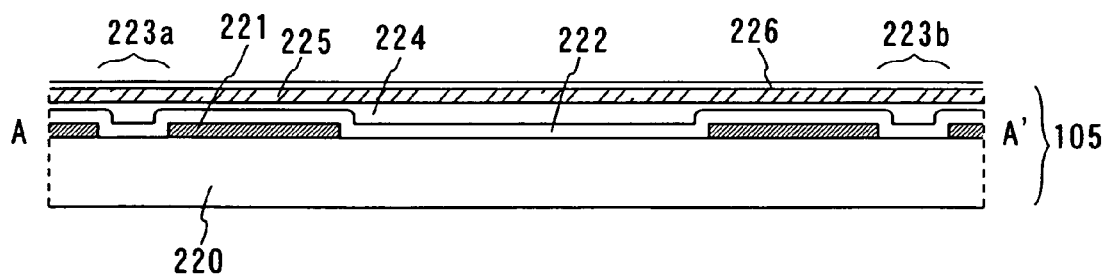

As shown in FIG. 3B, the light-shielding film 221 is formed over a substrate 220, and the light-shielding film 221 is formed to have opening portions in the region overlapping with the pixel of the active matrix substrate and the portions overlapping with the first markers 206 (206a and 206b) (FIGS. 2A and 2B). A colored film 222 is formed over the light-shielding film 221, and a planarizing film 224 for relieving unevenness generated by forming the light-shielding film 221 is formed over the colored film 222. Further, the opposite electrode 225 and an orientation film 226 are formed over the planarizing film 224.

The light-shielding film 221 is formed using a film having a light-shielding property (for example, a single layer film of chromium (Cr), a stacked film of chromium oxide ($Cr_xO_y$) and chromium (Cr), a resin BM (black matrix) in which colorant such as carbon black, dye, or the like is dispersed in a resin) to have a thickness of 10 to 150 nm, and is formed by patterning so as to have the opening portions in the region overlapping with the pixel of the active matrix substrate and the portions overlapping with the first markers 206 (206a and 206b). It is to be noted that opening portions formed in the portions overlapping with the first markers 206 (206a and 206b) (FIGS. 2A and 2B) are second markers 223 (223a and 223b). By making the first marker and the second marker overlap with each other as a mark for alignment, the active matrix substrate and the opposite substrate can be made to overlap with each other with favorable accuracy.

The colored film 222 is formed over the light-shielding film 221. The colored film 222 can be formed using a photosensitive resin, a resist, or the like in addition to an insulating film (polyimide or an acrylic resin) including a colored colorant. The thickness is preferably 1 to 3 μm. The colored film 222 may be formed using a material which shows a different color (for example, three colors of red, green, and blue) every one pixel column in the pixel portion. Alternatively, the colored film 222 may be formed using a material which shows a different color (for example, three colors of red, green, and blue) every one pixel. Further alternatively, the colored film 222 may be formed using a material which shows the same color in all pixels.

The planarizing film 224 is formed over the colored film 222. The planarizing film 224 can be formed using an insulating material (an organic material or an inorganic material) and can be formed using a single layer structure or a stacked structure. It is to be noted that, specifically, the planarizing film 224 can be formed using acrylic acid, methacrylic acid, and a derivative thereof; a heat-resistant high molecular compound such as polyimide, aromatic polyamide, polybenzimidazole, or an epoxy resin; an inorganic siloxane polymer, alkylsiloxane polymer, alkylsilsesquioxane polymer, or hydrogenated silsesquinoxane polymer including an Si—O—Si bond of compounds containing silicon, oxygen, or hydrogen formed using a siloxane polymer-based material as a starting material, which is typified by silica glass; a film formed from an organic siloxane polymer-based organic insulating material in which hydrogen bonded to silicon is substituted by an organic group such as methyl or phenyl, which is typified by hydrogenated alkylsilsesquioxane polymer; a silicon oxide film; a silicon nitride film; a silicon oxynitride film; a silicon nitride oxide film or other films formed from an inorganic insulating material containing silicon. In addition, the thickness is preferably 1 to 3 μm. It is to be noted that, although the planarizing film 224 is not necessarily provided in the present invention, orientation disorder of liquid crystals which may occur in forming a liquid crystal panel can be prevented by forming the planarizing film 224 to planarize a surface of the opposite substrate.

The opposite electrode 225 formed over the planarizing film 224 is preferably formed using a conductive material to have a thickness of 10 to 150 nm, and more preferably 40 to 100 nm.

As the conductive material to be used here, the following are given: indium tin oxide (ITO), zinc oxide (ZnO), indium zinc oxide (IZO) formed by using a target in which zinc oxide (ZnO) of 2 to 20 wt % is mixed with indium oxide containing silicon oxide, ITO containing silicon oxide as its composition, or the like, which is used as a transparent conductive film.

The orientation film 226 is formed over the opposite electrode 225 using a known material such as polyimide. It is to be noted that the orientation film 226 is shown only in FIG. 3B out of FIGS. 3A and 3B as a matter of convenience for explanation.

Figure 4A:
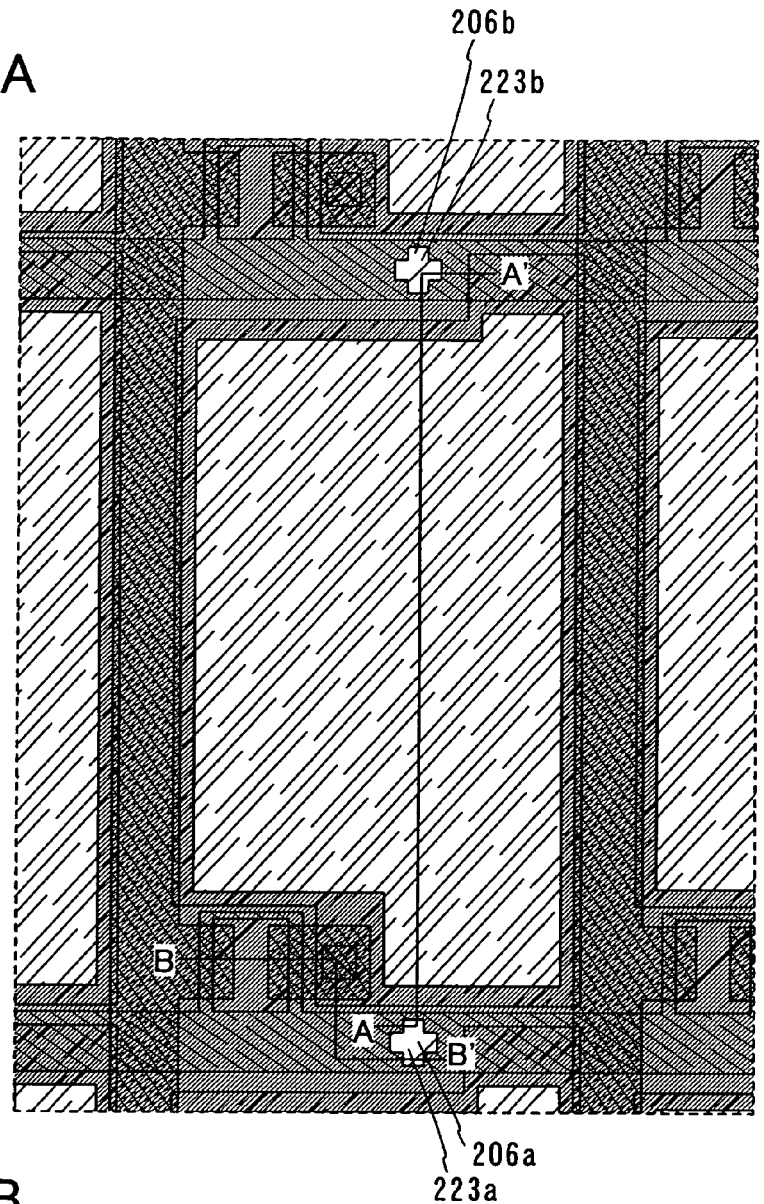
FIGS. 4A and 4B are explanatory views of a method for manufacturing an active matrix substrate of the present invention.
Figure 4B:
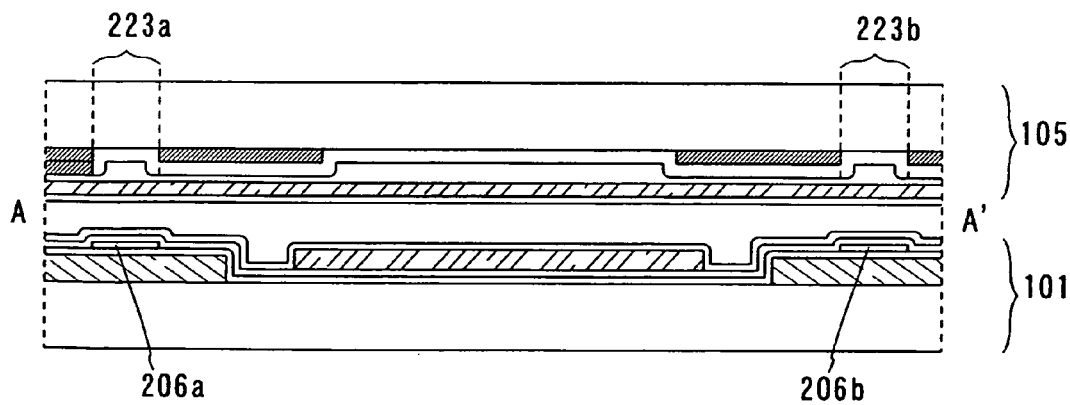

Subsequently, FIGS. 4A and 4B show a state where the active matrix substrate 101 shown in FIGS. 2A and 2B and the opposite substrate 105 shown in FIGS. 3A and 3B are attached to each other while alignment is conducted. FIG. 4A shows a plane view thereof and FIG. 4B shows a cross-sectional view taken along a line A-A' in FIG. 4A.

The first markers 206 (206a and 206b) formed over the active matrix substrate 101 and the second markers 223 (223a and 223b) formed over the opposite substrate 105 are made to overlap with each other, whereby alignment of both substrates can be conducted.

Here, variation in shapes of the first markers 206 (206a and 206b) formed over the active matrix substrate 101 and the second markers 223 (223a and 223b) formed over the opposite substrate 105 will be explained with reference to FIGS. 13A to 13J.

In FIGS. 13A to 13J, only a light-shielding film 501 and a first marker are shown on the active matrix substrate 101 side, and only a second marker is shown on the opposite substrate 105 side, as a matter of convenience for explanation of shapes of the markers (the first marker and the second marker) when both of the substrates overlap.

Figure 13A:
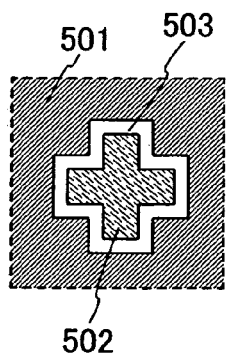
FIGS. 13A to 13J are explanatory views of a marker shape of the present invention.

FIG. 13A shows a case where a first marker 502 has a cross shape and a second marker 503 has a similar shape with a similarity ratio of 1 or more with respect to the first marker 502. It is to be noted that, in a case where the marker has the cross shape shown in FIG. 13A, lengths of all sides surrounding the periphery of the marker are the same.

Figure 13B:
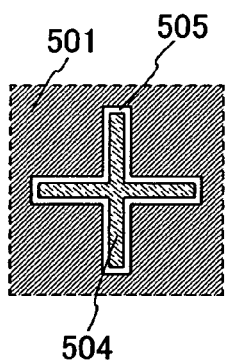

FIG. 13B shows a case where a first marker 504 has a cross shape and a second marker 505 has a similar shape with a similarity ratio of 1 or more with respect to the first marker 504. It is to be noted that, in the case where the marker has the cross shape shown in FIG. 13B, lengths of sides surrounding the periphery of the marker are different. In a case where the marker has the shape shown in FIG. 13B, alignment with higher accuracy than the case of the shape shown in FIG. 13A can be conducted.

Figure 13C:
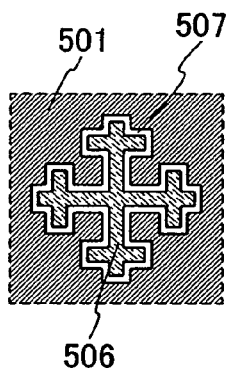

FIG. 13C shows a case where a first marker 506 has a shape in which each of the four edge portions of the cross shape of the first marker 504 shown in FIG. 13B has a cross shape and a second marker 507 has a similar shape with a similarity ratio of 1 or more with respect to the first marker 506.

Figure 13D:
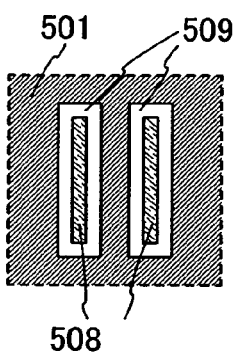

FIG. 13D shows a case where a first marker 508 has two rectangles arranged in parallel, and a second marker 509 has a similar shape with a similarity ratio of 1 or more with respect to the first marker 508. In a case where the marker has the shape shown in FIG. 13D, alignment is conducted with the use of two rectangles; therefore, alignment with higher accuracy can be conducted.

Figure 13E:
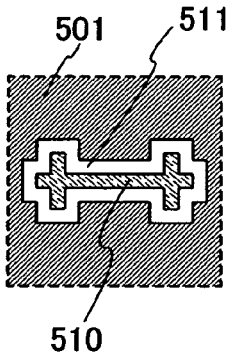

FIG. 13E shows a case where a first marker 510 has a shape in which each of the two edge portions of a rectangle has a cross shape and a second marker 511 has a similar shape with a similarity ratio of 1 or more with respect to the first marker 510.

Figure 13F:
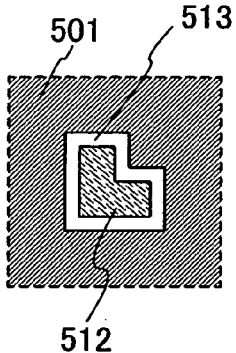

FIG. 13F shows a case where a first marker 512 has an L-shape and a second marker 513 has a similar shape with a similarity ratio of 1 or more with respect to the first marker 512.

Figure 13G:
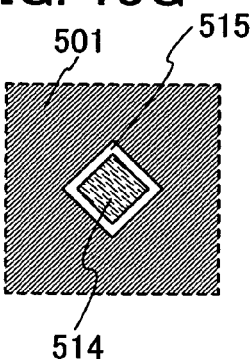

FIG. 13G shows a case where a first marker 514 has a quadrangle and a second marker 515 has a similar shape with a similarity ratio of 1 or more with respect to the first marker 514. It is to be noted that the quadrangle described here includes a square, a rectangle, a diamond, and the like.

Figure 13H:
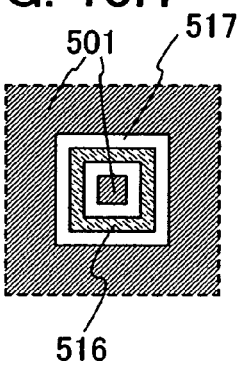

FIG. 13H shows a case where a first marker 516 has a shape having an opening portion, inside a quadrangle, having a similar shape with a similarity ratio of less than 1 with respect to the quadrangle, and a second marker 517 has a similar shape having a similarity ratio of 1 or more with respect to the first marker 516.

Figure 13I:
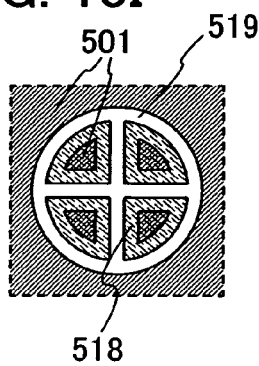

FIG. 13I shows a case where a first marker 518 has a shape having an opening portion, inside each of the four ¼ circles formed by equally dividing a circle into four and separating them, and the opening portion has a similar shape with a similarity ratio of less than 1 with respect to the ¼ circle, and a second marker 519 has a similar shape with a similarity ratio of 1 or more with respect to the first marker 518.

Figure 13J:
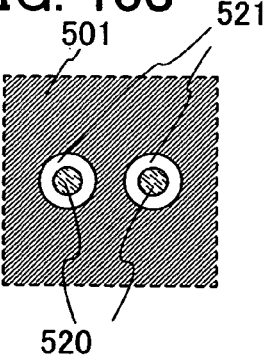

FIG. 13J shows a case where a first marker 520 has two circles arranged next to each other and a second marker 521 has a similar shape with a similarity ratio of 1 or more with respect to the first marker 520. In the case of FIG. 13J, the markers are circles; therefore, there is a merit in terms of forming a marker that residue is hard to remain in patterning for forming a marker.

It is to be noted that variation in the marker shapes shown in FIGS. 13A to 13J described above is only an example of a marker shape which can be used for the present invention, and a marker shape of the present invention is not limited thereto.

In general, an edge or a corner of the marker shape described above is rounded due to a process of exposure, etching, or the like. However, there is no problem in a case where the edge or the corner thereof is rounded to the extent that an essential function, namely alignment, is not lost.

By interposing a liquid crystal layer between the active matrix substrate 101 and the opposite substrate 105 as described in this embodiment mode, a liquid crystal display panel can be formed.

In the present invention, the first markers 206 (206a and 206b) formed over the active matrix substrate 101 are formed at the same time as the channel formation region of the TFT 204 by pattering the first semiconductor film, and the second markers 223 (223a and 223b) formed over the opposite substrate 105 are also formed at the same time in forming the light-shielding film 221 by pattering a film having a light-shielding property. Therefore, alignment of the active matrix substrate and the opposite substrate with high accuracy can be realized without requiring an additional step.

Embodiment Mode 2

In Embodiment Mode 2, a method for manufacturing the active matrix substrate shown in Embodiment Mode 1 will be explained with reference to FIGS. 5A to 5E and FIGS. 6A to 6D. It is to be noted that FIGS. 5A to 5E and FIGS. 6A to 6D show a manufacturing method up to the formation of a cross-sectional structure taken along a line B-B' in FIG. 2A of the active matrix substrate shown in FIGS. 2A and 2B. In FIGS. 2A and 2B, FIGS. 5A to 5E, and FIGS. 6A to 6D, description is made using the same reference numerals.

Figure 5A:
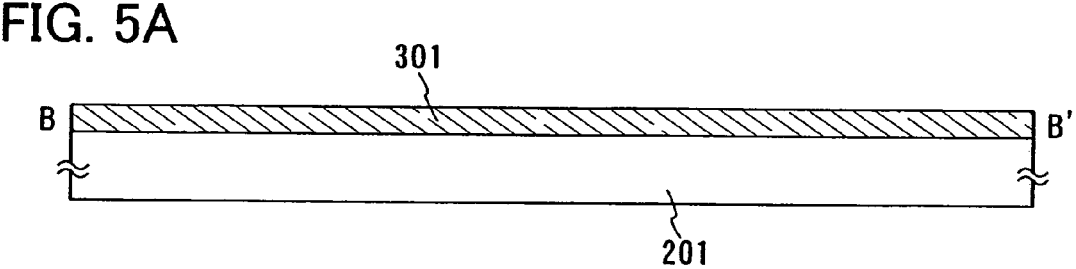
FIGS. 5A to 5E are explanatory views of a method for manufacturing an active matrix substrate of the present invention.

As shown in FIG. 5A, a first conductive film 301 is formed over a substrate 201. The first conductive film 301 is formed using a film containing a semiconductor such as Si or Ge, a metal element such as Ag, Au, Cu, Ni, Pt, Pd, Ir, Rh, W, Al, Ta, Mo, Cd, Zn, Fe, Ti, Zr, Ba, or Nd, an alloy material containing the element as its main component, a compound material such as metal nitride, a film of indium tin oxide (ITO), indium zinc oxide (IZO) formed by using a target in which zinc oxide (ZnO) of 2 to 20 wt % is mixed with indium oxide containing silicon oxide, ITO containing silicon oxide as its composition, or the like, which is used as a transparent conductive film by a film formation method such as sputtering, PVD, CVD, droplet discharging, printing, or electroplating.

A glass substrate, a quartz substrate, a substrate formed from an insulating substance such as ceramic such as alumina, a plastic substrate, a silicon wafer, a metal plate, or the like can be used for the substrate 201.

Although not shown here, in order to prevent an impurity from mixing into a semiconductor film and the like from the substrate 201, a blocking film such as a silicon nitride film, a silicon oxide film, a silicon nitride oxide film, or a stacked film of these may be formed over the substrate 201.

Figure 5B:

A gate electrode 302 and a gate line 202a are formed by patterning the first conductive film 301 (FIG. 5B). In a case where the first conductive film 301 is formed by a film formation method such as sputtering or CVD, a mask is formed over the conductive film by droplet discharging, a photolithography step, exposure of a photosensitive material using a laser beam direct drawing apparatus and development, or the like. Then, the conductive film is patterned into a desired shape using the mask.

Since the pattern can be directly formed when droplet discharging is used, the gate electrode 302 and the gate line 202a are formed by discharging and heating a liquid substance in which the aforementioned metal particles are dissolved or dispersed in an organic resin from a discharging opening (hereinafter, referred to as a nozzle). The organic resin may be one or more kinds of organic resins serving as a binder, solvent, a dispersing agent, and a coating agent of metal particles. Typically, polyimide, acrylic, a novolac resin, a melamine resin, a phenol resin, an epoxy resin, a silicon resin, a furan resin, a diallyl phthalate resin, and other known organic resins are given.

The viscosity of the liquid substance is preferably 5 to 20 mPa·s for preventing drying and for allowing the metal particles to be discharged smoothly from the discharging opening. The surface tension of the liquid substance is preferably 40 mN/n or less. Note that the viscosity and the like of the liquid substance may be set appropriately in accordance with a solvent to be used or the application.

Although the diameter of the metal particle contained in the liquid substance may be several nm to 10 μm, it is preferably as small as possible in order to prevent a nozzle from clogging and to make high-resolution patterns. More preferably, each metal particle has a grain diameter of 0.1 μm or less.

Subsequently, an insulating film 205 is formed. The insulating film 205 is formed to have a single layer structure or a stacked structure of a silicon oxide film, a silicon nitride film, a silicon oxynitride film, a silicon nitride oxide film, other insulating films containing silicon, and the like by a film formation method such as CVD or sputtering. A thickness of the insulating film 205 is preferably 300 to 500 nm, and more preferably 350 to 480 nm.

A first semiconductor film 304 is formed. The first semiconductor film 304 can be formed by a film formation method such as CVD or sputtering. The first semiconductor film 304 can be formed using any of an amorphous semiconductor film, an amorphous semiconductor film partially containing a crystalline state, and a crystalline semiconductor film, each of which contains silicon, silicon-germanium (SiGe), or the like as its main component and has a different crystalline state. The first semiconductor film 304 may also contain an acceptor element or a donor element such as phosphorus, arsenic, and boron additionally to the aforementioned main component. A thickness of the first semiconductor film 304 is preferably 40 to 250 nm, and more preferably 50 to 220 nm.

Figure 5C:
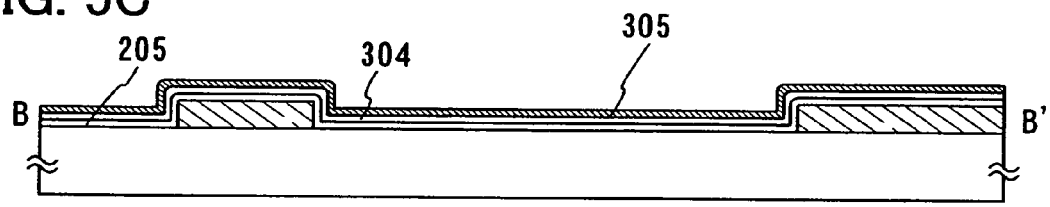

Then, a second semiconductor film 305 having one conductivity type is formed over the first semiconductor film 304. The second semiconductor film 305 is formed by a film formation method such as CVD or sputtering. A film formed here such as an amorphous semiconductor film, an amorphous semiconductor film partially containing a crystalline state, or a crystalline semiconductor film, each of which contains silicon or silicon-germanium (SiGe) as its main component and has a different crystalline state, contains an acceptor element or a donor element such as phosphorus, arsenic, and boron additionally to the aforementioned main component (FIG. 5C).

Figure 5D:
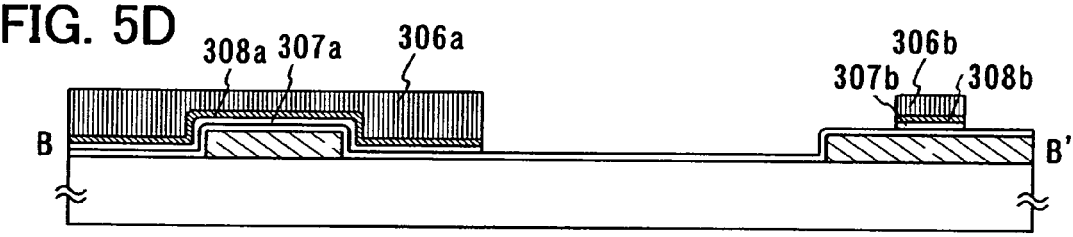

As shown in FIG. 5D, first masks 306 (306a and 306b) are formed in a desired location over the second semiconductor film 305, and each part of the first semiconductor film 304 and the second semiconductor film 305 is etched using the masks, thereby obtaining first semiconductor films (307a and 307b) and second semiconductor films 308 (308a and 308b), respectively, which are patterned. It is to be noted that, in these semiconductor films, the first semiconductor film 307a serves as a channel formation region of a TFT and the first semiconductor film 307b serves as a marker for alignment (FIG. 5D).

Figure 5E:
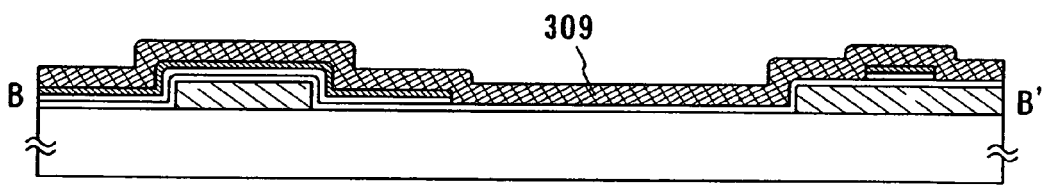

As shown in FIG. 5E, after removing the first masks 306 (306a and 306b), a second conductive film 309 is formed over the second semiconductor films 308 (308a and 308b) and the insulating film 205. A thickness of the second conductive film 309 is preferably 100 nm or more, and more preferably 200 to 700 nm. As a conductive material used for the second conductive film 309, a film containing a semiconductor such as Si or Ge, a film formed from a metal element such as Ag, Au, Cu, Ni, Pt, Pd, Ir, Rh, W, Al, Ta, Mo, Cd, Zn, Fe, Ti, Zr, or Ba, a film formed from an alloy material containing the element as its main component, a film formed from a compound material such as metal nitride, and the like are given.

Figure 6A:
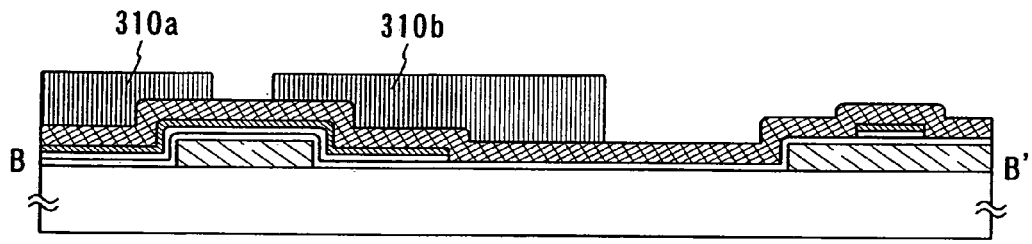
FIGS. 6A to 6D are explanatory views of a driver circuit of a liquid crystal display panel of the present invention.
Figure 6B:
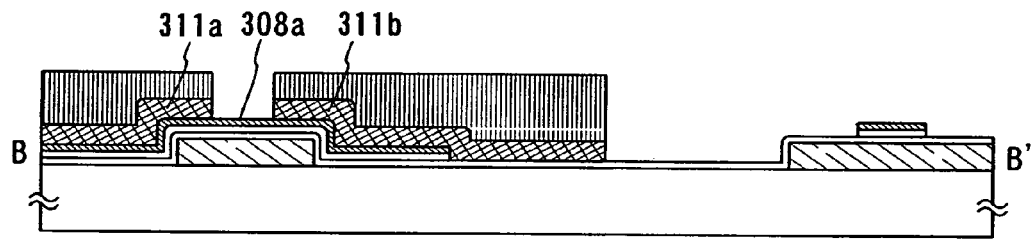

Second masks 310 (310a and 310b) are formed over the second conductive film 309, and part of the second conductive film 309 is etched to be formed into a desired shape. Second conductive films 311 (311a and 311b) which are patterned here serve as a source electrode and a drain electrode of the TFT (FIGS. 6A and 6B). In order to form the second conductive film 309 into a desired shape, a method can be employed, by which a mask is formed over the second conductive film 309 by droplet discharging, a photolithography step, exposure of a photosensitive material using a laser beam direct drawing apparatus and development, or the like to etch the second conductive film 309 into a desired shape using the mask.

After removing the second masks 310 (310a and 310b), part of the second semiconductor film 308a is etched using the patterned second conductive films 311 (311a and 311b) as masks, thereby forming a source region 312a and a drain region 312b of a TFT 204. Further, at the same time, the second semiconductor film 308b formed over the first semiconductor film 307b serving as a marker is also removed (FIG. 6C).

Here, in the second conductive films 311 (311a and 311b), a portion (311a) overlapping with the source region 312a is to be a source electrode 207a, and a portion (311b) overlapping with the drain region 312b is to be a drain electrode 207b.

Figure 6C:
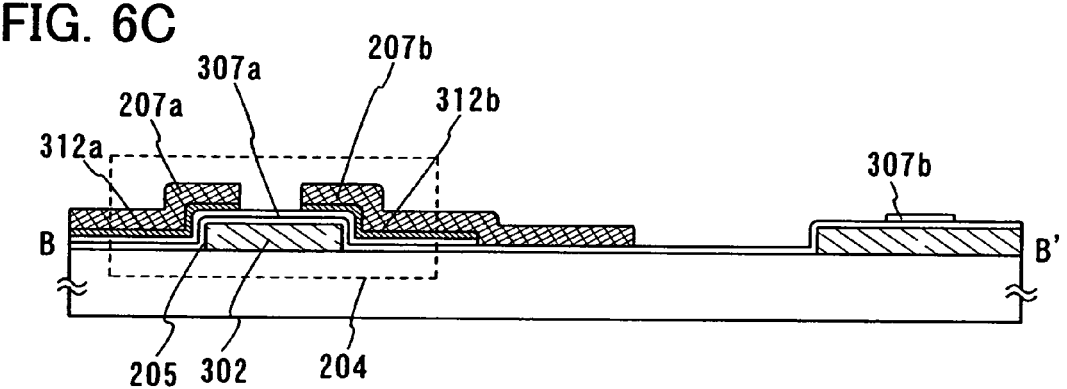

In accordance to the above, the TFT 204 including the gate electrode 302, the insulating film 205, the first semiconductor film 307a serving as a channel formation region, the source region 312a, the drain region 312b, the source electrode 207a, and the drain electrode 207b is formed (FIG. 6C).

Then, a protective film 208 is formed. It is to be noted that the protective film 208 is formed to have a single layer structure or a stacked structure of a silicon oxide film, a silicon nitride film, a silicon nitride oxide film, and a silicon oxynitride film by a film formation method such as plasma CVD or sputtering. A thickness of the protective film 208 is preferably 100 to 500 nm, and more preferably 200 to 300 nm.

Figure 6D:
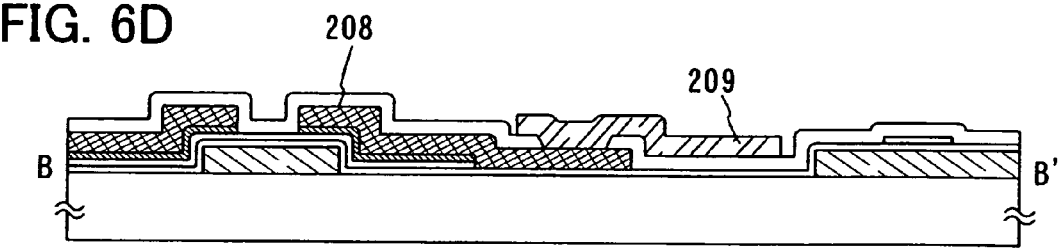

An opening portion is formed in a location which is part of the protective film 208 and overlaps with the drain electrode 207b to form a pixel electrode 209 electrically connected to the drain electrode 207b in the opening portion (FIG. 6D).

The pixel electrode 209 is formed by patterning a transparent conductive film such as indium tin oxide (ITO), indium zinc oxide (IZO) formed by using a target in which zinc oxide (ZnO) of 2 to 20 wt % is mixed with indium oxide containing silicon oxide, or ITO containing silicon oxide as its composition, formed by sputtering, evaporation, CVD, coating, or the like. A thickness of the pixel electrode 209 is preferably 10 to 150 nm, and more preferably 40 to 120 nm.

In accordance with the above steps, an active matrix substrate of the present invention can be formed. Further, after conducting alignment so that a marker formed over the active matrix substrate and a marker formed over an opposite substrate overlap, a liquid crystal display panel provided with a liquid crystal material between these substrates can be formed. It is to be noted that a structure of the liquid crystal display panel will be explained in detail in Embodiment Mode 3.

By using a marker manufactured over the active matrix substrate by the method shown in this embodiment mode, alignment of the active matrix substrate and the opposite substrate with high accuracy can be realized without requiring an additional step.

Embodiment Mode 3

Figure 7A:
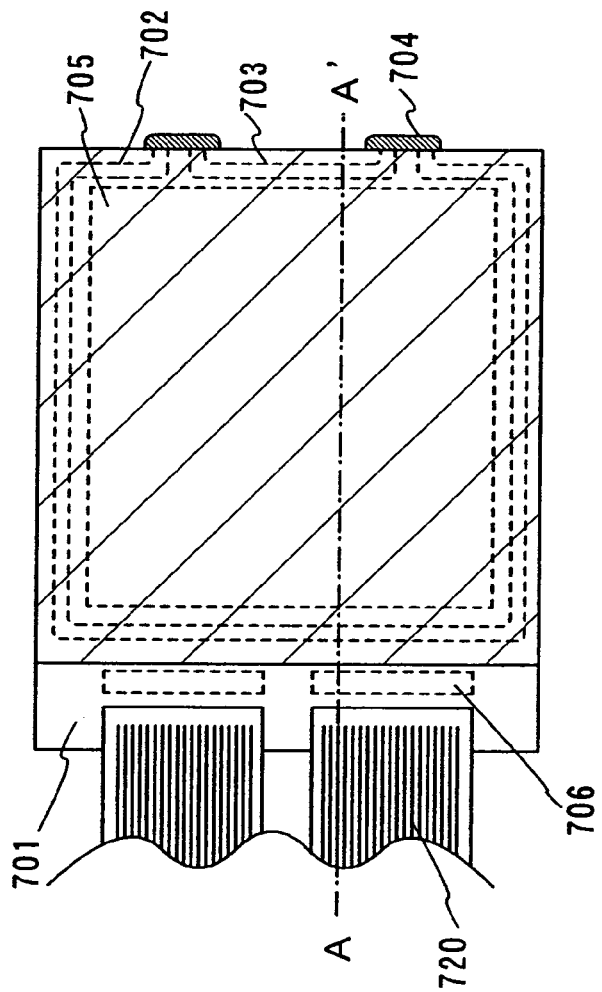
FIGS. 7A and 7B are explanatory views of a liquid crystal display panel of the present invention.
Figure 7B:
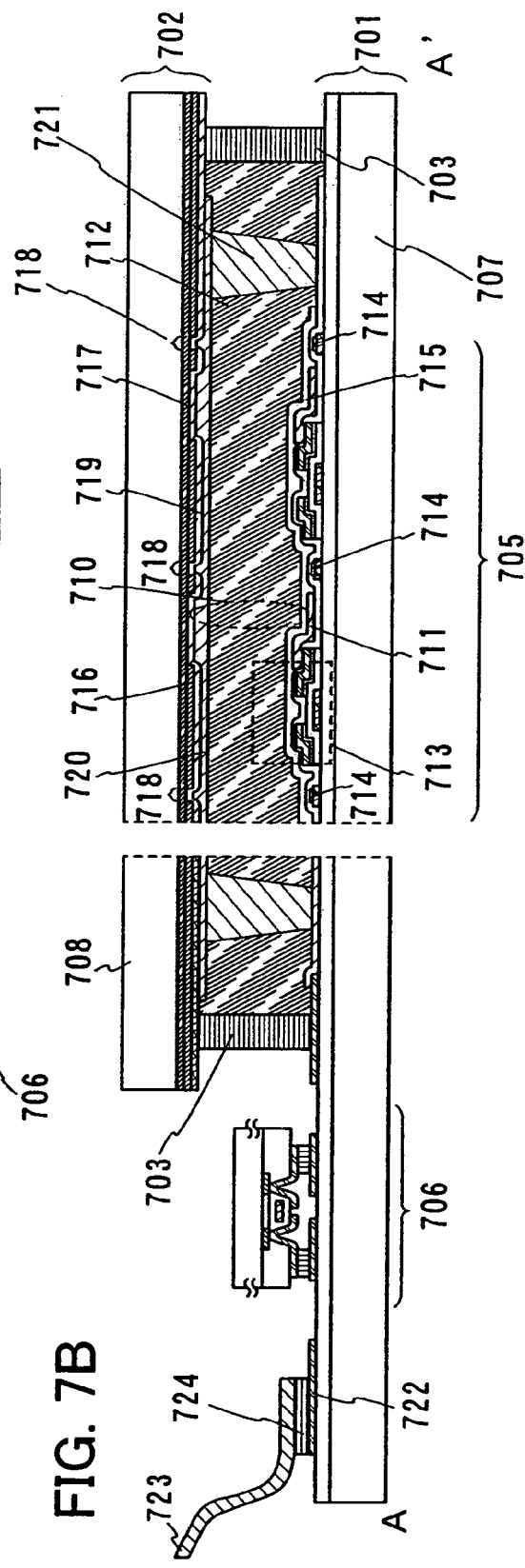

In this embodiment mode, a structure of the liquid crystal display panel of the present invention will be explained with reference to FIGS. 7A and 7B. FIG. 7A is a top view of a liquid crystal panel in which a liquid crystal material is interposed between an active matrix substrate 701 and an opposite substrate 702. FIG. 7B corresponds to a cross-sectional view taken along a line A-A' in FIG. 7A. The active matrix substrate explained in Embodiment Mode 1 or 2 is used as the active matrix substrate 701.

In FIG. 7A, a portion 705 surrounded by a dotted line is a pixel portion, and a portion 706 surrounded by a dotted line is a driver circuit portion. In this embodiment mode, the pixel portion 705 is formed in a region surrounded by a sealant 703, and the driver circuit portion 706 is mounted outside the region.

The sealant 703 used for sealing a space between the active matrix substrate 701 and the opposite substrate 702 contains a gap material for maintaining the distance of the enclosed space. The space surrounded by the active matrix substrate 701, the opposite substrate 702, and the sealant 703 is filled with a liquid crystal material. Although FIG. 7A shows a case where, after attaching the active matrix substrate 701 and the opposite substrate 702 to each other by the sealant 703, a space between both substrates is filled with a liquid crystal material to conduct sealing with a sealing member 704, the present invention is not limited thereto. A method (ODF method) can also be employed, in which both of the active matrix substrate 701 and the opposite substrate 702 are attached to each other after dropping a liquid crystal material over one of the substrates.

Next, the cross-sectional structure will be explained with reference to FIG. 7B. The pixel portion 705 is formed over a first substrate 707 which forms the active matrix substrate 701 and includes a plurality of semiconductor elements typified by TFTs. Further, in this embodiment mode, a source line driver circuit and a gate line driver circuit are included in the driver circuit portion 706 mounted on the substrate.

The pixel portion 705 is provided with a plurality of pixels, and a first electrode 711 as a pixel electrode is electrically connected to a driving TFT 713 through a wiring. Further, the pixel portion 705 is provided with a plurality of first markers 714 used for conducting alignment in attaching the opposite substrate 702. An orientation film 715 is formed over the first electrode 711, the driving TFT 713, and the first marker 714.

On the other hand, a light-shielding film 716, a colored layer (color filter) 717, a second marker 718, and a second electrode 719 as an opposite electrode are formed over a second substrate 708 which forms the opposite substrate 702. An orientation film 720 is formed over the second electrode 719.

In the liquid crystal display panel shown in this embodiment mode, a portion in which a liquid crystal layer 712 is interposed between the first electrode 711 formed over the active matrix substrate 701 and the second electrode 719 formed over the opposite substrate 702 is a liquid crystal element 710.

Reference numeral 721 denotes a columnar spacer that is provided to control a distance (cell gap) between the active matrix substrate 701 and the opposite substrate 702. The columnar spacer 721 is formed by etching an insulating film into a desired shape. It is to be noted that a spherical spacer may be used as well.

Various signals and potentials to be given to the pixel portion 705 and the driver circuit portion 706 are supplied from an FPC 723 through a connecting wiring 722. The connecting wiring 722 and the FPC 723 are electrically connected to each other with an anisotropic conductive film or an anisotropic conductive resin 724. It is to be noted that a conductive paste such as solder or silver paste may be used instead of the anisotropic conductive film or the anisotropic conductive resin.

Although not shown, a polarizing plate is fixed by an adhesive onto one or both of the surface of the active matrix substrate 701 and the surface of the opposite substrate 702. It is to be noted that a retardation film may be provided additionally to the polarizing plate.

In the liquid crystal display panel explained above, the active matrix substrate and the opposite substrate are attached to each other after conducting alignment so that the first marker formed over the active matrix substrate and the second marker formed over the opposite substrate overlap using the present invention. It is to be noted that these markers (the first marker and the second marker) can be formed without requiring an additional step; therefore, a liquid crystal display panel in which alignment with high accuracy is easily realized can be provided.

Embodiment Mode 4

In this embodiment mode, a method for mounting a driver circuit in the liquid crystal display panel of the present invention will be explained with reference to FIGS. 8A to 8C.

Figure 8A:
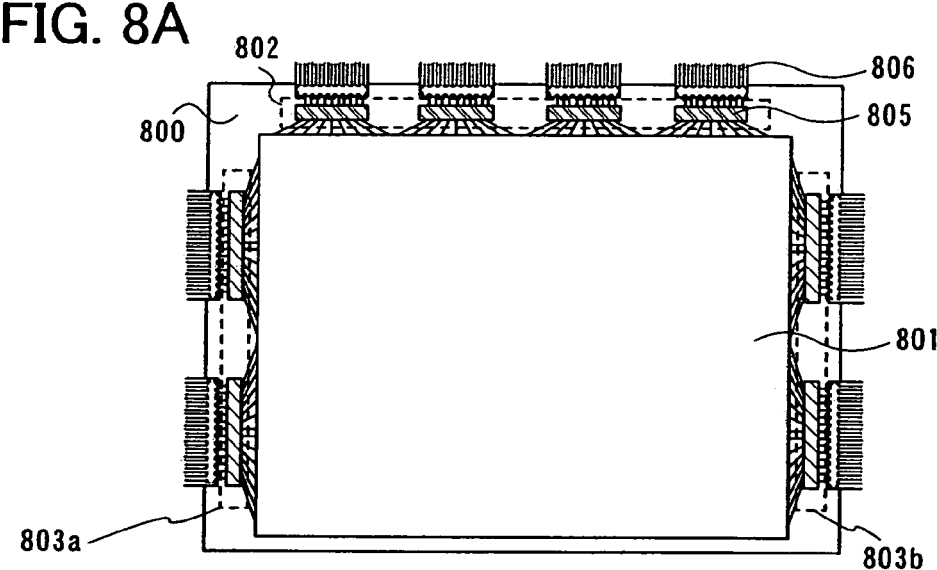
FIGS. 8A to 8C are explanatory views of a driver circuit mounted on a liquid crystal display panel of the present invention.

In FIG. 8A, a source line driver circuit 802 and gate line driver circuits 803a and 803b are mounted on the periphery of a pixel portion 801. That is to say, the source line driver circuit 802, the gate line driver circuits 803a and 803b, and the like are mounted by mounting an IC chip 805 on a substrate 800 by a mounting method using a known anisotropic conductive adhesive and an anisotropic conductive film, COG, wire bonding, reflow treatment using a solder bump, or the like. It is to be noted that the IC chip 805 is connected to an external circuit through an FPC (Flexible Printed Circuit) 806.

Part of the source line driver circuit 802, for example an analog switch may be formed over the substrate in an integrated manner and the other part may be separately mounted using an IC chip.

Figure 8B:
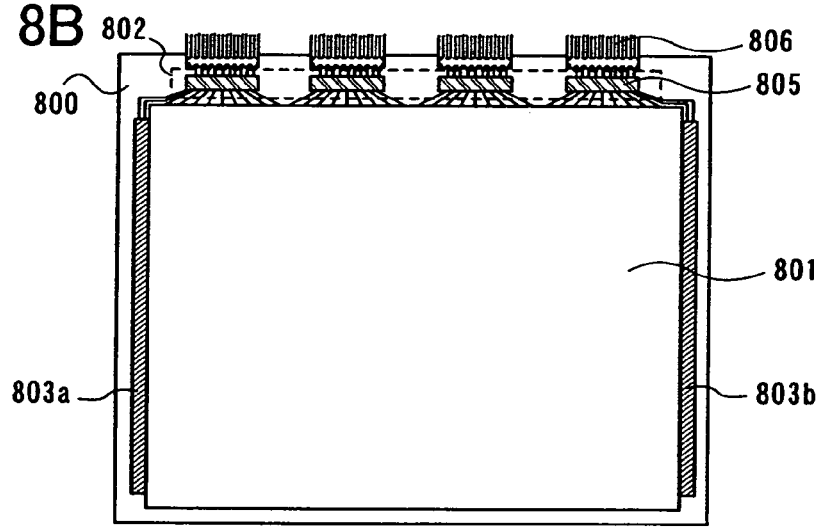

In FIG. 8B, a pixel portion 801, gate line driver circuits 803a and 803b, and the like are formed over a substrate in an integrated manner, and a source line driver circuit 802 and the like are separately mounted using an IC chip. That is to say, an IC chip 805 is mounted by a mounting method such as COG on a substrate 800 over which the pixel portion 801, the gate line driver circuits 803a and 803b, and the like are formed in an integrated manner, so that the source line driver circuit 802 and the like are mounted. It is to be noted that the IC chip 805 is connected to an external circuit through an FPC 806.

Part of the source line driver circuit 802, for example an analog switch may be formed over the substrate in an integrated manner and the other part may be separately mounted using an IC chip.

Figure 8C:
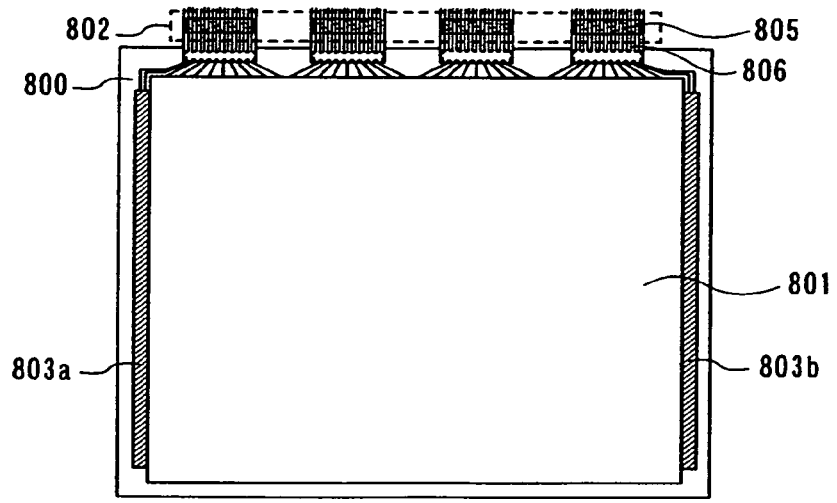

In FIG. 8C, a source line driver circuit 802 and the like are mounted by TAB. An IC chip 805 is connected to an external circuit through an FPC 806. Although the source line driver circuit 802 and the like are mounted by TAB in FIG. 8C, a gate line driver circuit and the like may be mounted by TAB as well.

When the IC chip 805 is mounted by TAB, a pixel portion can be provided to occupy a large area with respect to the substrate, whereby a narrower frame can be accomplished.

Instead of the IC chip 805, an IC in which an IC is formed over a glass substrate (hereinafter referred to as a driver IC) may be provided. Since the IC chip 805 is extracted from a circular silicon wafer, the shape of a mother substrate is limited. Meanwhile, the driver IC is formed using a glass substrate as a mother substrate, the shape of which is not limited, resulting in increased productivity. Accordingly, the shape and size of the driver IC can be freely determined. For example, when a driver IC with a long side of 15 to 80 mm is formed, the smaller number of driver ICs is required as compared with the case of mounting an IC chip. As a result, the number of connecting terminals can be reduced and productive yield can be increased.

The driver IC can be formed using a crystalline semiconductor formed over a substrate, and the crystalline semiconductor may be formed by irradiation of continuous wave laser light. A semiconductor film obtained by irradiation of continuous wave laser light has few crystal defects and crystal grains with large grain diameters. Accordingly, a transistor having such a semiconductor film is improved in mobility and response speed and can be driven at high speed, which is suitable for a driver IC.

In the liquid crystal display panel on which a driver circuit is mounted by the mounting method shown in the above, alignment with high accuracy is conducted using a first marker formed over the active matrix substrate and a second marker formed over the opposite substrate using the present invention. Accordingly, a liquid crystal display panel with high visibility can be provided even in a case where a driver circuit is mounted.

Embodiment Mode 5

In this embodiment mode, a liquid crystal module formed by connecting an external circuit such as a power supply circuit or a controller to a liquid crystal display panel of the present invention formed by implementing Embodiment Modes 1 to 4, which displays color images using white light, will be explained using a cross-sectional view of FIG. 9.

Figure 9:
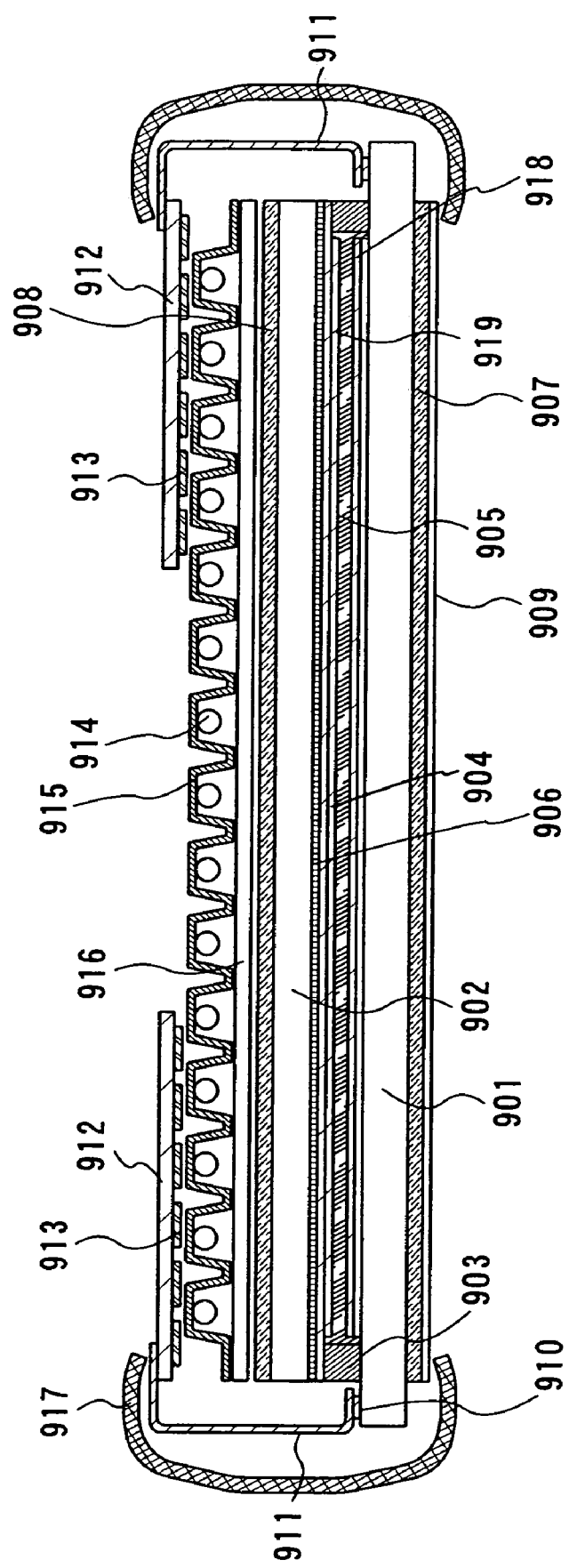
FIG. 9 is an explanatory view of a liquid crystal module of the present invention.

As shown in FIG. 9, an active matrix substrate 901 and an opposite substrate 902 are firmly fixed by a sealant 903, and a liquid crystal layer 905 is provided between the active matrix substrate 901 and the opposite substrate 902, thereby forming a liquid crystal display panel.

A colored film 906 formed over the active matrix substrate 901 is required in order to display color images. In a case of the RGB system, a colored film corresponding to each color of red, green, and blue is provided corresponding to each pixel. Orientation films 918 and 919 are formed inside the active matrix substrate 901 and the opposite substrate 902. Polarizing plates 907 and 908 are provided outside the active matrix substrate 901 and the opposite substrate 902. A protective film 909 is formed over a surface of the polarizing plate 907 to reduce the external impact.

A connecting terminal 910 provided over the active matrix substrate 901 is connected to a wiring board 912 through an FPC 911. The wiring board 912 includes an external circuit 913 such as a pixel driver circuit (an IC chip, a driver IC, or the like), a control circuit, or a power supply circuit.

A back light unit includes a cold cathode tube 914, a reflecting plate 915, an optical film 916, and an inverter (not shown), which functions as a light source to emit light to the liquid crystal display panel. The liquid crystal display panel, the light source, the wiring board 912, the FPC 911, and the like are held and protected by a bezel 917.

The liquid crystal module described above is formed using a liquid crystal display panel in which alignment with high accuracy is conducted using a first marker formed over the active matrix substrate and a second marker formed over the opposite substrate using the present invention. Therefore, display with high visibility can be realized also in a case of forming a module.

Embodiment Mode 6

According to the present invention, an alignment method using a first marker formed over an active matrix substrate and a second marker formed over an opposite substrate will be explained.

In attaching the active matrix substrate and the opposite substrate to each other, all or the arbitrary number of markers of both substrates are/is described using a CCD camera or an optical microscope to conduct alignment of both substrates so that the marker over one substrate and the marker over the other substrate formed to correspond thereto overlap. In this case, after separately obtaining image information (including location information in an x-axis direction, a y-axis direction, and a z-axis direction) of the substrates, a location to be attached is calculated to conduct the attachment. However, alignment may be conducted in such a way that an overlapping state of the markers (the first marker and the second marker) is checked from the opposite substrate side using a CCD camera or an optical microscope in a state of fixing both substrates in the z-axis direction and one or both of the substrates is/are moved in the x-axis direction or the y-axis direction.

In a case where the markers are partially misaligned, alignment may be conducted after calculating an averaged location of the markers and conducting fine adjustment of the x-axis direction and the y-axis direction arbitrarily. In addition, processing may be conducted by detecting dust, contaminant, short-circuit of a wiring, or the like at the same time. In this case, two types of information can be obtained in one scanning of a CCD or the like.

Further, information such as misalignment of a pattern of a mother glass and a defective location is stocked and sent to database for process management, thereby feeding back to the entire process. Accordingly, productivity can be further enhanced.

Embodiment Mode 7

As electronic devices provided with a liquid crystal display device and the like of the present invention, a television device (also simply referred to as a television or a television receiver), a camera such as a digital camera or a digital video camera, a telephone device (also simply referred to as a telephone set or a telephone), an information terminal such as a PDA, a game machine, a monitor for computer, a computer, an audio reproducing device such as a car audio system or an MP3 player, an image reproducing device provided with a recording medium, such as a home-use game machine, and the like are given. Preferred modes thereof will be explained with reference to FIGS. 10A to 10E.

Figure 10A:
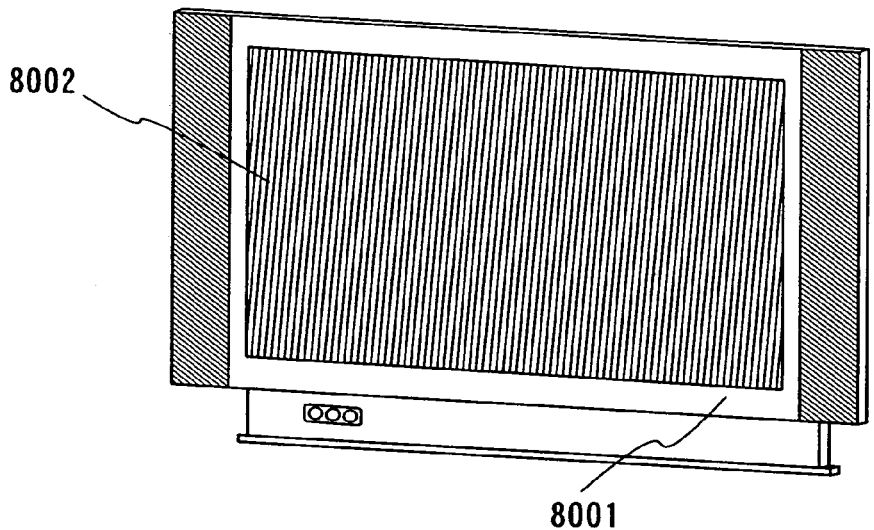
FIGS. 10A to 10E are explanatory views of an electronic device.

A television device shown in FIG. 10A includes a main body 8001, a display portion 8002, and the like. The liquid crystal display device and the like of the present invention can be applied to the display portion 8002. Since a display panel in which attachment is conducted with high accuracy by a marker for alignment formed without providing an additional step is used for the liquid crystal display device and the like of the present invention, a television device capable of displaying images with high visibility can be provided.

Figure 10B:
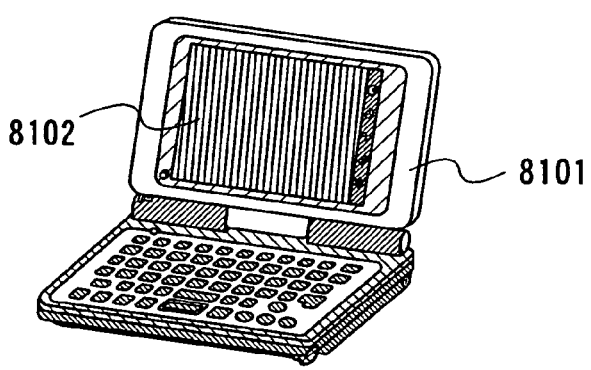

An information terminal device shown in FIG. 10B includes a main body 8101, a display portion 8102, and the like. The liquid crystal display device and the like of the present invention can be applied to the display portion 8102. Since a display panel in which attachment is conducted with high accuracy by a marker for alignment formed without providing an additional step is used for the liquid crystal display device and the like of the present invention, an information terminal device capable of displaying images with high visibility can be provided.

Figure 10C:
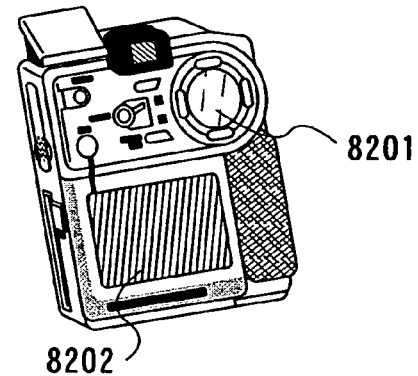

A digital video camera shown in FIG. 10C includes a main body 8201, a display portion 8202, and the like. The liquid crystal display device and the like of the present invention can be applied to the display portion 8202. Since a display panel in which attachment is conducted with high accuracy by a marker for alignment formed without providing an additional step is used for the liquid crystal display device and the like of the present invention, a digital video camera capable of displaying images with high visibility can be provided.

Figure 10D:
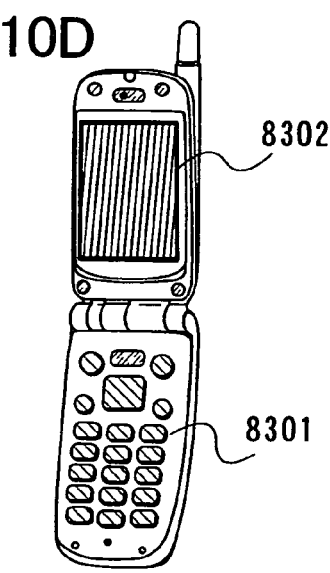

A telephone set shown in FIG. 10D includes a main body 8301, a display portion 8302, and the like. The liquid crystal display device and the like of the present invention can be applied to the display portion 8302. Since a display panel in which attachment is conducted with high accuracy by a marker for alignment formed without providing an additional step is used for the liquid crystal display device and the like of the present invention, a telephone set capable of displaying images with high visibility can be provided.

Figure 10E:
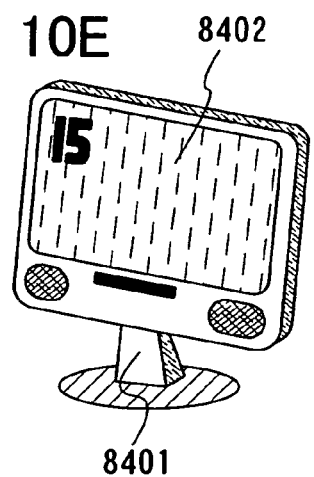

A liquid crystal monitor shown in FIG. 10E includes a main body 8401, a display portion 8402, and the like. The liquid crystal display device of the present invention can be applied to the display portion 8402. Since a liquid crystal display panel in which attachment is conducted with high accuracy by a marker for alignment formed without providing an additional step is used for the liquid crystal display device of the present invention, a liquid crystal monitor capable of displaying images with high visibility can be provided.

As set forth above, a liquid crystal display device and the like of the present invention using a display panel in which attachment is conducted with high accuracy by a marker for alignment formed without providing an additional step is used for a display portion thereof, whereby an electronic device capable of displaying images with high visibility can be provided.

This application is based on Japanese Patent Application serial No. 2005-329867 filed in Japan Patent Office on Nov. 15, 2005, the entire contents of which are hereby incorporated by reference.

What is claimed is:

1. A display device comprising:
   a wiring, a thin film transistor, a first pixel electrode, a second pixel electrode next to the first pixel electrode, and a pattern as a marker for alignment over one of a pair of substrates arranged to be opposed to each other; and
   a light-shielding film between the pattern and the other one of the pair of substrates, the light-shielding film having an opening portion,
   wherein the pattern is between the first pixel electrode and the second pixel electrode,
   wherein the pattern and a film comprised in the thin film transistor are on a same surface, and
   wherein the pattern and the opening portion are opposed to each other in a same location.

2. A display device according to claim 1,
   wherein the pattern comprises an amorphous or crystalline semiconductor, which contains silicon or silicon-germanium as its main component.

3. A display device according to claim 1,
   wherein the pattern is the marker having any of a cross shape, a quadrangle, and a circle.

4. A display device according to claim 1,
   wherein the opening portion has a similar shape with a similarity ratio of 1 or more with respect to the pattern.

5. A display device according to claim 1,
   wherein the display device is a liquid display device.

6. A display device according to claim 1,
   wherein the pattern is formed using a same semiconductor film as a channel formation region included in the thin film transistor.

7. A display device comprising:
   a wiring, a thin film transistor, a pixel electrode, and a plurality of patterns as markers for alignment over one of a pair of substrates arranged to be opposed to each other; and
   a light-shielding film between the plurality of patterns and the other one of the pair of substrates, the light-shielding film having a plurality of opening portions,
   wherein at least one of the plurality of patterns comprises same materials as a semiconductor film of the thin film transistor, and
   wherein the one of the plurality of patterns and one of the plurality of opening portions are opposed to each other in a same location.

8. A display device according to claim 7,
   wherein the one of the plurality of patterns comprises an amorphous or crystalline semiconductor, which contains silicon or silicon-germanium as its main component.

9. A display device according to claim 7,
   wherein the one of the plurality of patterns is a marker having any of a cross shape, a quadrangle, and a circle.

10. A display device according to claim 7,
    wherein the opening portion has a similar shape with a similarity ratio of 1 or more with respect to the one of the plurality of patterns.

11. A display device according to claim 7,
    wherein the display device is a liquid crystal display device.

12. A display device according to claim 7,
    wherein the one of the plurality of patterns is formed using a same semiconductor film as a channel formation region included in the thin film transistor.

13. A display device comprising:
a wiring, a thin film transistor, a pixel electrode, and a pattern as a marker for alignment over one of a pair of substrates arranged to be opposed to each other; and
an opposite electrode and a light-shielding film between the pattern and the other one of the pair of substrates, the light-shielding film having an opening portion,
wherein the pattern overlaps with the wiring, and
wherein the pattern and the opening portion are opposed to each other in a same location.

14. A display device according to claim 13,
wherein a part of the pixel electrode overlaps with the wiring.

15. A display device according to claim 14,
wherein the part of the pixel electrode overlaps with the wiring in a location in which the pixel electrode does not overlap with the pattern.

16. A display device according to claim 13,
wherein a reflective conductive film is formed over a part of the pixel electrode.

17. A display device according to claim 16,
wherein the reflective conductive film is formed so that an area thereof is equal to or less than 50% of an area of the pixel electrode.

18. A display device according to claim 13,
wherein the pattern is formed using a same semiconductor film as a channel formation region included in the thin film transistor.

19. A display device according to claim 13,
wherein the pattern comprises an amorphous or crystalline semiconductor, which contains silicon or silicon-germanium as its main component.

20. A display device according to claim 13,
wherein the pattern is the marker having any of a cross shape, a quadrangle, and a circle.

21. A display device according to claim 13,
wherein the opening portion has a similar shape with a similarity ratio of 1 or more with respect to the pattern.

22. A display device according to claim 13,
wherein the display device is a liquid crystal display device.

23. A display device comprising:
a wiring, a thin film transistor, a pixel electrode and a pattern as a marker for alignment over a first substrate; and
a light-shielding film between the pattern and a second substrate,
wherein the pattern overlaps with the wiring,
wherein the light-shielding film has a first opening portion corresponding to the pixel electrode and a second opening portion corresponding to the pattern.

24. A display device according to claim 23,
wherein the pattern and the second opining portion coextensive.

25. A display device according to claim 23,
wherein, the display device is a liquid display device.

26. A display device according to claim 23,
wherein the pattern is formed using a same semiconductor film as a channel formation region included in the thin film transistor.

27. A display device comprising:
a wiring, a thin film transistor, a pixel electrode, and a pattern as a marker for alignment over a first substrate; and
a light-shielding film between the pattern and a second substrate,
wherein the pattern comprises the same materials as a semiconductor film of the thin film transistor,
wherein the light-shielding film has a first opening portion for display and a second opening portion, and
wherein the pattern and the second opening portion overlap.

28. A display device according to claim 27,
wherein, the display device is a liquid display device.

29. A display device according to claim 27,
wherein the pattern is formed using a same semiconductor film as a channel formation region included in the thin film transistor.

30. A display device comprising:
a wiring, a thin film transistor, a first pixel electrode, a second pixel electrode next to the first pixel electrode, and a pattern as a marker for alignment over a first substrate; and
a light-shielding film between the pattern and a second substrate,
wherein the pattern is between the first pixel electrode and the second pixel electrode,
wherein the pattern and a film comprised in the thin film transistor are on a same surface,
wherein the light-shielding film has a first opening portion for display and a second opening portion, and
wherein the pattern and the second opening portion overlap.

31. A display device according to claim 30,
wherein, the display device is a liquid crystal display device.

32. A display device according to claim 30,
wherein the pattern is formed using a same semiconductor film as a channel formation region included in the thin film transistor.

33. A manufacturing method of display device comprising the steps of:
forming a thin film transistor and a pattern as a marker for alignment over a first substrate;
forming a pixel electrode over the thin film transistor and the pattern;
forming a light-shielding film having a first opening portion and a second opening portion over a second substrate; and
attaching the first substrate and the second substrate using the pattern and the second opening portion for alignment so that the pixel electrode of the first substrate and the first opening portion of the second substrate overlap,
wherein the pattern overlaps with a wiring,
wherein the pattern and a semiconductor film of the thin film transistor are on the same surface, and
wherein the alignment is conducted by making the pattern of the first substrate and the second opening portion of the second substrate overlap.

* * * * *

UNITED STATES PATENT AND TRADEMARK OFFICE
CERTIFICATE OF CORRECTION

PATENT NO. : 7,714,958 B2  Page 1 of 1
APPLICATION NO. : 11/598322
DATED : May 11, 2010
INVENTOR(S) : Kunio Hosoya It is certified that error appears in the above-identified patent and that said Letters Patent is hereby corrected as shown below:

In The Specification:

Column 11, Line 26, Change "mN/n" to -- mN/m --.

In The Claims:

Column 18, Claim 5, Line 28, After "liquid" insert -- crystal --.

Column 19, Claim 24, Line 53, Change "opining portion coextensive" to -- opening portion are coextensive --.

Column 20, Claim 28, Line 14, After "liquid" insert -- crystal --.

Signed and Sealed this

Fifth Day of October, 2010

David J. Kappos
*Director of the United States Patent and Trademark Office*